(12) United States Patent
Aoki

(10) Patent No.: US 6,816,275 B1
(45) Date of Patent: Nov. 9, 2004

(54) NETWORK SYSTEM AND NETWORK INTERFACE CARD

(75) Inventor: Mikio Aoki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/701,462

(22) PCT Filed: Mar. 29, 2000

(86) PCT No.: PCT/JP00/01984
§ 371 (c)(1),
(2), (4) Date: Nov. 29, 2000

(87) PCT Pub. No.: WO00/58823
PCT Pub. Date: Oct. 5, 2000

(30) Foreign Application Priority Data

Mar. 29, 1999 (JP) .......................................... 11-086936
Mar. 29, 1999 (JP) .......................................... 11-086937

(51) Int. Cl.[7] .......................... G06F 15/06; G06F 15/16; G06F 3/00
(52) U.S. Cl. ...................... 358/1.15; 358/1.15; 709/229; 709/230; 709/250; 719/321; 719/327
(58) Field of Search ............................... 709/230, 250, 709/227, 229; 358/1.15; 719/321, 327, 324

(56) References Cited

U.S. PATENT DOCUMENTS 5,978,560 A * 11/1999 Tan et al. ................... 358/1.15
6,076,110 A * 6/2000 Murphy et al. ............. 709/228

FOREIGN PATENT DOCUMENTS

JP 8-305512 11/1996

* cited by examiner

Primary Examiner—Scott Rogers
Assistant Examiner—Saeid Ebrahimi
(74) Attorney, Agent, or Firm—Oliff & Berridge, PLC

(57) ABSTRACT

An object is, by connecting a network interface card to a network, to achieve marked increases in functions, as compared to usage without the connection.

A client network interface card 40a performs a capability information inquiry 110 to other devices on the network. Virtual device information 114, which has increased functions over the original capabilities of its own device, is disclosed to a PC 14, based on capability information 112 obtained from other devices. The PC 14 transmits printing data to the client network interface card 40a and commissions printing, based on the virtual printer information 114. The client network interface card which has received a printing commission exceeding the original capabilities of its own device determines a server device 20a to commission the processing to, based on the capability information 112. Then, processing is commissioned to the server device 20a, and printing data following processing is received and printing output is performed.

27 Claims, 18 Drawing Sheets

NETWORK SYSTEM AND NETWORK INTERFACE CARD

This application is a 371 PCT/JP00/01984 Mar. 29, 2000.

BACK OF THE INVENTION

1. Field of the Invention

The present invention relates to a network system containing a network interface card which commissions other devices on the network to process printing data to be printed by its own device.

2. Description of Related Art

Generally, it is often the case that the processing capabilities of printers are low. Accordingly, printer drivers in computers often perform processing such as image processing, and creates printing data which the printer is capable of printing and which the printer is made to print.

SUMMARY OF THE INVENTION

However, this requires the computer side to execute image processing programs which have a great processing load, so a great load is placed on the computer. Thus, with computers having low processing capabilities, there has been the problem that the image processing takes time, and printing cannot be started for some time.

Also, the speed of the computer transmitting printing data to the printer is affected by the printing speed of the printer. That is to say, the computer cannot start the next task until all printing data has been sent to the printer, or there has been the problem that the performance of the subsequent task drops drastically.

For example, a laser printer has one page worth of printing memory, but an ink-jet type printer only has one line worth of printing memory. Accordingly, in the event of printing with an ink-jet type printer, the computer is not released from the transmitting processing for some time, and there have been problems in that the subsequent application does not run correctly or that the response of the computer is slow.

Also, commands which the printer can process are generally fixed. Accordingly, the computer must have prepared commands (ESC/P, PostScript, and other commands for controlling printing, and page commands) according to the printer. Thus, there has been the problem that printing cannot be made from printers not compatible regarding commands which can be provided by the printer drivers in the computer.

The present invention has been made in light of such problems, and it is an object thereof to connect a printer provided with a network interface card to a network, so as to achieve marked increases in functions therein as compared to usage without the connection. Specifically, it is an object thereof to provide a network system and network interface card capable of reducing the transmitting time of printing data, speeding up the release speed of the computer, alleviating the printer driver processing of the computer, enabling high-speed printing with low processing capability computers, and dealing with various types of printer commands.

The network system according to the present invention is a network system containing a network interface card capable of receiving printing commands from a computer, and at least one other device, the network interface card comprising: capability information inquiring means (capability information inquiring unit) for inquiring the other device connected to the network regarding capability information of capabilities including at least one of memory capacity, processing relating to printer language, image processing, and image processing execution environment; virtual printer information determining means (virtual printer information disclosing unit) for judging whether or not there are other devices which will support capability improvements of its own device, based on the capability information sent from the other device connected to the network in response to the capability information inquiry, and for determining virtual printer information of its own device; and virtual printer information disclosing means (virtual printer information disclosing unit) for disclosing the virtual printer information to the computer; the other device comprising: capability information responding means (capability information response unit) for responding to the network interface card regarding capability information of capabilities including at least one of memory capacity of its own device, processing relating to printer language, image processing, and image processing execution environment, in response to the capability information inquiry.

The network interface card discloses virtual printer information to the computer, indicating how its own device can behave on the network. This virtual printer information has taken in the capabilities of other devices connected to the network in addition to the original capabilities of its own device. Accordingly, the computer can commission a printer provided with a network interface card having increased capabilities to perform the printing process. Accordingly, there are the advantages that the restrictions for the computer to send data to the printer for printing are reduced.

Now, the term image processing includes processing for converting image data RGB into CMYK, rendering processing for rendering characters and lines to bitmap, and color conversion processing for performing color conversion according to the printer model to which the network interface card is provided. The term image processing capabilities includes capabilities relating to environments and executing programs for executing the processing converting RGB into CMYK, rendering processing, and color conversion processing.

The term capabilities relating to image processing execution environment means an environment mainly for executing the image processing, and includes the memory capacity, operating system environment, and CPU processing capabilities, capable of executing image processing programs.

The term processing relating to printer language includes at least one of supported printer languages and printer language conversion programs.

The virtual printer information determining means of the network system according to the present invention or the network interface card thereof determines virtual printer information to the effect that at least one of the given printer commands and printer languages can be processed, in the event that the other device connected to the network has conversion capabilities for converting at least one of the given printer commands and printer languages into at least one of printer commands and printer languages which the printer to which the network interface card has been provided can process; and the virtual printer information disclosing means discloses the determined virtual printer information to the computer.

Thus, the network interface card can disclose to the computer virtual printer information to the effect that processing can be performed for printer languages other than those executable by the printer to which the network interface card is provided. Accordingly, the degree of freedom of the computer in selecting printer languages to use increases. Hence, the computer can reduce transmitting time by selecting from the virtual printer information the printer language which requires the least transmitting time, for example.

The network interface card of the network system according to the present invention comprises: processing commissioning means, (processing commisioning unit) wherein, in the event a printing commission for printing data received from the computer exceeds the original processing capabilities of its own device, a server device to send the received printing data to is determined based on the capability information sent from the other device, the printing data is transmitted to the server device in real-time, and the given processing is commissioned; transmission requesting means (transmission requesting unit) for requesting transmission of printing data to the server device following given processing; and printing control means (print control unit) for performing control so as to print based on printing data following the given processing, received in response to the transmission request; and the server device comprises: server processing means, (server processing unit) wherein the given processing is performed to the printing data received from the network interface card, and printing data following the given processing is transmitted to the network interface card in response to transmission request from the network interface card.

The network interface card according to the present invention comprises: processing commissioning means, wherein, in the event a printing commission for printing data received from the computer exceeds the original processing capabilities of its own device, a server device to send the received printing data to is determined based on the capability information sent from the other device, the printing data is transmitted to the server device in real-time, and the given processing is commissioned; transmission requesting means for requesting transmission of printing data to the server device following given processing; and printing control means for performing control so as to print based on printing data following the given processing, received in response to the transmission request.

The computer transmits printing data to the network interface card based on the virtual printer information disclosed by the network interface card. As for a network interface card which has received printing data which exceeds the processing capabilities of the network interface card, a server device for commissioning the processing exceeding the original capabilities of the network interface card is determined according to the capabilities information, the printing data is transmitted to the server device, and processing is thus commissioned.

According to the present invention, the network interface card can realize capabilities higher than those of its own device, by commissioning processing to another server device connected to the network. Accordingly, marked increases in functions can be realized without increasing the cost of the printer.

Also, the capabilities of the printer to which the network interface card is mounted to which the computer issues printing commands are improved, thereby reducing restrictions on the computer regarding printing.

With the network system according to the present invention, the given processing contains conversion processing for converting the printing data received from the computer into printing data suitable for the printer to which the network interface card is provided; the processing commissioning means determines the server device to perform the conversion processing, based on the capability information relating to printer-related functions including at least one of printer language-related processing and image processing, and printing data received from the computer; and the server processing means contains conversion processing means (conversion processing unit) for converting the printing data received from the network interface card into printing data suitable for the printer to which the network interface card is provided.

The computer transmits printing data to the network interface card, based on the virtual printer information which the network interface card has disclosed. The network interface card, upon receiving printing data which cannot be printed with the original processing capabilities of the network interface card or which is not subjected to image processing suitable for its own device, determines another server device for commissioning conversion processing for converting this into printing data suitable for its own device, by the capability information. Then, the printing data is transmitted to said server device, and processing is commissioned.

The server device converts the received printing data into printing data suitable for printing with the printer to which the network interface card is provided, using processing programs held by its own device, and transmits these to said network interface card. Then, the printer to which is mounted the network interface card which has received the post-conversion printing data performs the printing thereof.

According to the present invention, the network interface card can realize functions exceeding the original processing capabilities, by commissioning processing to other server devices connected to the network. For example, a printer to which a network interface card is provided generally cannot perform processing other than the print commands it holds in a fixed manner, but printing can be realized even in the event that there is a printing language which the printer cannot process, by having another device to perform conversion.

Also, the printing restrictions of the computer are decreased, since the capabilities of the network interface card to which the computer issued printing commands are increased.

The processing commissioning means of the network system according the present invention transmits device information of its own device to the server device at the time of commissioning the given processing; and the conversion processing means converts the printing data into printing data suitable for the printer to which the network interface card is provided, based on the device information.

The term device information refers to anything which can identify the printer model to which the network interface card is provided, such as a printer ID, for example.

With the network system according the present invention, the given processing includes storing processing for storing the printing data received from the computer; the processing commissioning means determines the server device for performing the storing processing, based on capability information relating to the memory capacity; and the server processing means contains storage processing means (storage processing unit) for receiving printing data sent from the network interface card and storing this in the memory of its own device.

For example, an ink-jet printer only has printing memory for one line worth of printing. Accordingly, generally when sending from a computer to the printer, the computer must perform transmission according to the printing speed of the printer. Accordingly, problems of the release speed of the computer being slow occur, such as the subsequent application not running correctly or the response of the computer being slow.

However, according to the present invention, the network interface card transfers the received data to a server device which has great memory capacity, so there are no restrictions from printer printing speeds at the time of the computer transmitting the data. Accordingly, the transmission of data from the computer to the network interface card can be completed in a short time, and the computer can be released at an early time.

The processing commissioning means of the network system according to the present invention or the network interface card thereof stores printing data sent from the computer in the printing memory of its own device until there is no more empty memory, and after there is no more empty printing memory, transfers the received printing data to the server device in real-time; the transmission requesting means requests transmission of printing data which its own device has transmitted to the server device, according to the state of empty printing memory due to printing; the printing control means performs control so as to sequentially receive printing data transferred before, and stores this in the printing memory of its own device; with printing and transfer of printing data of the server device being executed in parallel.

According to the present invention, printing data which does not fit into the printing memory is transmitted to the server device, and re-received therefrom once printing memory becomes available due to printing. Accordingly, transfer is made to the server device while printing, so the processing time can be reduced.

With the network system according to present invention; the given processing includes image processing of the printing data received from the computer; the network interface card further contains image processing program storing means (program memory) for storing image processing programs which perform image process suitable to the device to which the network interface card has been mounted, with regard to the printing data; the processing commissioning means determines a server device having an execution environment for the image processing, based on capability information relating to the image processing execution environment, and transmits the printing data and the image processing programs for performing image processing for the printing data to the server device; and the server processing means further contains image processing execution means (image processing executing unit) for receiving the printing data and the image processing programs for performing image processing of the printing data sent from the network interface card, and performing image processing of the printing data using the image processing programs.

Image processing such as rendering processing and color conversion processing and the like differ among the devices of printers to which the network interface card is provided. Accordingly, having the server device at the side commissioned to perform the processing requires the server device to have massive amounts of image processing programs corresponding to all devices, which makes for poor memory efficiency.

Accordingly, memory efficiency is better with an arrangement wherein the client side which commissions the processing has image processing programs optimal for its own device, and hands the data and image processing programs together for processing commissioning.

Now, the term image processing includes processing for converting image data RGB into CMYK, rendering processing for rendering characters and lines to bitmap, and color conversion processing for performing color conversion according to the printer model to which the network interface card is provided.

The term image data refers to data which represents the contents displayed as an image on a display for example, and also includes text data. This also includes data not subjected at all to image processing such as conversion of RGB into CMYK, rendering processing, color conversion, etc., and also data to which processing is performed partially or totally.

An arrangement may be made wherein the computer looks at the virtual printer information of the network interface card and performs image processing, creates printing data including printer commands and the like, and transmits to the printer. Also, in the event that there are image processing capabilities on the network interface card, the image data before performing image processing may be transmitted to the network interface card.

Also, an arrangement may be made wherein, in the event that the server device has an image processing program of the same type of the image processing program which the network interface card is attempting to transmit, the version information is checked, and transmitted only in the event that the version information of the image processing program which the network interface card has indicates that this is newer.

The network interface card of the network system according to the present invention performs inquiry of the capability information to another device connected to the network, in the event of at least one of the following cases; a case wherein its own device is connected to the network, a case wherein a new device has been connected to the network, and a case wherein there has been a capability information inquiry from the computer.

Performing inquiry in the event that the network interface card is connected to the network allows virtual printer information to be disclosed to the computer in a speedy manner. Making inquiry in the event that there is connection of a new device to the network allows virtual printer information taking in the capabilities of the new device to be shown. Making inquiry in the event that there has been an inquiry regarding capability information from the computer allows the newest virtual printer information to be shown at all times.

The network interface card of the network system according to the present invention contains capability information storing means for correlating the capability information to the devices on the network, and storing the information.

According to such an arrangement, in the event that capability information of the other server device is necessary, the necessary capability information can be obtained simply by making reference to the capability information storing means. Accordingly, the trouble of making inquiry every time can be done away with, and the processing time can be reduced.

With the network system according to the present invention, the printing data contains image data or image data and printer commands.

Also, the network interface card of the network system according to the present invention is a network interface card capable of receiving printing commands from a computer, connected to a network system containing at least one device, the network interface card comprising: capability information inquiring means for inquiring the other device connected to the network regarding capability information of capabilities including at least one of memory capacity, processing relating to printer language, image processing, and image processing execution environment; virtual printer information determining means for judging whether or not there are other devices which will support capability improvements of its own device, based on the capability information sent from the other device connected to the network in response to the capability information inquiry, and for determining virtual printer information of its own device; and virtual printer information disclosing means for disclosing the virtual printer information to the computer.

The network interface card discloses virtual printer information to the computer, indicating how its own device can behave on the network. This virtual printer information has taken in the capabilities of other devices connected to the network in addition to the original capabilities of its own device. Accordingly, the computer can commission a printer having increased capabilities to perform the printing processing. Thus, there are the advantages that the restrictions for the computer to send data to the printer for printing are reduced.

Now, the term image processing includes processing for converting image data RGB into CMYK, rendering processing for rendering characters and lines to bitmap, and color conversion processing for performing color conversion according to the printer model to which the network interface card is provided. The term image processing capabilities includes capabilities relating to environments and executing programs for executing the processing converting RGB into CMYK, rendering processing, and color conversion processing.

The term capabilities relating to image processing execution environment means an environment mainly for executing the image processing, and includes the capabilities of memory capacity, operating system environment, and CPU processing, capable of executing image processing programs.

The term processing relating to printer language includes at least one of supported printer languages and printer language conversion programs.

The virtual printer information determining means of the network interface card according to the present invention determines virtual printer information to the effect that at least one of given printer commands and printer languages can be processed, in the event that the other device connected to the network has conversion capabilities for converting at least one of the given printer commands and printer languages into at least one of printer commands and printer languages which the printer can process to which the network interface card is provided; and the virtual printer information disclosing means discloses the determined virtual printer information to the computer.

Thus, the network interface card can disclose to the computer virtual printer information to the effect that processing can be performed for printer languages other than those executable by the printer to which the network interface card is provided. Accordingly, the degree of freedom of the computer in selecting printer languages to use increases. Hence, the computer can reduce transmitting time by selecting from the virtual printer information the printer language which requires the least transmitting time, for example.

The network interface card according to the present invention comprises: processing commissioning means, wherein, in the event a printing commission for printing data received from the computer exceeds the original processing capabilities of its own device, a server device to send the received printing data to is determined based on the capability information sent from the other device, the printing data is transmitted to the server device in real-time, and the given processing is commissioned; transmission requesting means for requesting transmission of printing data to the server device following given processing; and printing control means for performing control so as to print based on printing data following the given processing, received in response to the transmission request; the server device comprising: server processing means, wherein the given processing is performed to the printing data received from the network interface card, and printing data following the given processing is transmitted to the network interface card in response to a transmission request from the network interface card.

The network interface card according to the present invention comprises: processing commissioning means, wherein, in the event a printing commission for printing data received from the computer exceeds the original processing capabilities of its own device, a server device to send the received printing data to is determined based on the capability information sent from the other device, the printing data is transmitted to the-server device in real-time, and the given processing is commissioned; transmission requesting means for requesting transmission of printing data to the server device following given processing; and printing control means for performing control so as to print based on printing data following the given processing, received in response to the transmission request.

The computer transmits printing data to the network interface card based on the virtual printer information disclosed by the network interface card. As for a network interface card which has received printing data which exceeds the processing capabilities of the network interface card, a server device for commissioning the processing exceeding the original processing capabilities of the network interface card is determined according to the capabilities information, the printing data is transmitted to the server device, and processing is thus commissioned.

According to the present invention, the network interface card can realize capabilities higher than those originally of its its own device, by commissioning processing to another server device connected to the network. Accordingly, marked increases in functions can be realized without increasing the cost of the printer itself.

Also, the capabilities of the printer to which the network interface card is mounted to which the computer issues printing commands are improved, thereby reducing restrictions on the computer regarding printing.

With the network interface card according to the present invention, the given processing contains conversion processing for converting the printing data received from the computer into printing data suitable for its own device; and the processing commissioning means determines the server device to perform the conversion processing, based on the capability information relating to printer-related functions including at least one of printer language-related processing and image processing, and printing data received from the computer.

The computer transmits printing data to the network interface card, based on the virtual printer information which the network interface card has disclosed. The network interface card, upon receiving printing data which cannot be printed with the original processing capabilities of the network interface card or which is not subjected to image processing suitable for its own device, determines another server device for commissioning conversion processing for converting this into printing data suitable for its own device, by the capability information. Then, the printing data is transmitted to said server device, and processing is commissioned.

The server device converts the received printing data into printing data suitable for printing with the printer to which the network interface card is provided, using processing programs held by its own device, and transmits these to said network interface card. Then, the printer to which is mounted the network interface card which has received the post-conversion printing data performs the printing thereof.

According to the present invention, the network interface card can realize functions exceeding the original processing capabilities, by commissioning processing to other server devices connected to the network. For example, a printer to which a network interface card is provided generally cannot perform processing other than the print commands it holds in a fixed manner, but printing can be realized even in the event that there is a printing language which the printer cannot process, by having another device to perform conversion.

Also, the printing restrictions of the computer are decreased, since the capabilities of the network interface card to which the computer issued printing commands are increased.

The processing commissioning means of the network interface card according to the present invention transmits device information of its own device to the server device at the time of commissioning the given processing.

The term device information refers to anything which can identify the printer model to which the network interface card is provided, such as a printer ID, for example.

With the network interface card according the present invention, the given processing includes storing processing for storing the printing data received from the computer; the processing commissioning means determines the server device for performing the storing processing, based on capability information relating to the memory capacity.

For example, an ink-jet printer only has printing memory for one line worth of printing. Accordingly, generally when sending from a computer to the printer, the printer must perform transmission according to the printing speed of the printer. Accordingly, problems of the release speed of the computer being slow occur, such as the subsequent application not running correctly or the response of the computer being slow.

However, according to the present invention, the network interface card transfers the received data to a server device which has great memory capacity, so there are no restrictions from printer printing speeds at the time of the computer transmitting the data. Accordingly, the transmission of data from the computer to the network interface card can be completed in a short time, and the computer can be released at an early time.

The processing commissioning means of the network interface card according to the present invention stores printing data sent from the computer in the printing memory of its own device until there is no more empty memory, and after there is no more empty printing memory, transfers received the printing data to the server device in real-time; the transmission requesting means requests transmission of printing data which its own device has transmitted to the server device, according to the state of empty printing memory due to printing; the printing control means performs control so as to sequentially receive printing data transferred before, and stores this in the printing memory of its own device; with printing and transfer of printing data of the server device being executed in parallel.

According to the present invention, printing data which does not fit into the printing memory is transmitted to the server device, and re-received therefrom once printing memory becomes available due to printing. Accordingly, transfer is made to the server device while printing, so the processing time can be reduced.

With the network interface card according to the present invention, the given processing includes image processing of the printing data received from the computer; the network interface card further contains image processing program storing means for storing image processing programs which perform image process suitable to the device to which its own device has been mounted, with regard to the printing data; and the processing commissioning means determines a server device having an execution environment for the image processing, based on capability information relating to the image processing execution environment.

Image processing such as rendering processing and color conversion processing and the like differ among the devices of printers to which the network interface card is provided. Accordingly, having the server device at the side commissioned to perform the processing requires the server device to have massive amounts of image processing programs corresponding to all devices, which makes for poor memory efficiency.

Accordingly, memory efficiency is better with an arrangement wherein the client side which commissions the processing has image processing programs optimal for its own device, and hands the data and image processing programs together for processing commissioning.

Now, the term image processing includes processing for converting image data RGB into CMYK, rendering processing for rendering characters and lines to bitmap, and color conversion processing for performing color conversion according to the printer model to which the network interface card is provided.

The term image data refers to data which represents the contents displayed as an image on a display or the like for example, and also includes text data. This also includes data not subjected at all to image processing such as conversion of RGB into CMYK, rendering processing, color conversion, etc., and also data to which processing is performed partially or totally.

An arrangement may be made wherein the computer looks at the virtual printer information of the network interface card and performs image processing, creates printing data including printer commands and the like, and transmits to the printer. Also, in the event that there is image processing capability in the network interface card, the image data before performing image processing may be transmitted to the network interface card.

Also, an arrangement may be made wherein, in the event that the server device has an image processing program of the same type of the image processing program which the network interface card is attempting to transmit, the version information is checked, and transmitted only in the event that the version information of the image processing program which the network interface card has indicates that this is newer, for example.

The network interface card according to the present invention performs inquiry of the capability information to another device connected to the network, in the event of at least one of the following cases; a case wherein its own device is connected to the network, a case wherein a new device has been connected to the network, and a case wherein there has been a capability information inquiry from the computer.

Performing inquiry in the event that the network interface card is connected to the network allows virtual printer information to be disclosed to the computer in a speedy manner. Making inquiry in the event that there is connection of a new device to the network allows virtual printer information taking in the capabilities of the new device to be shown. Making inquiry in the event that there has been an inquiry regarding capability information from the computer allows the newest virtual printer information to be shown at all times.

The network interface card according to the present invention contains capability information storing means (capability information storing unit) for correlating the capability information to the devices on the network, and storing the information.

According to such an arrangement, in the event that capability information of the other server device is necessary, the necessary capability information can be obtained simply by making reference to the capability information storing means. Accordingly, the trouble of making inquiry every time can be done away with, and the processing time can be reduced.

With the network interface card according to the present invention, the printing data contains image data or image data and printer commands.

The network interface card according to the present invention comprises: capability information responding means for responding to the other device connected to network regarding capability information of capabilities including at least one of memory capacity of printer to which its own device is provided, processing relating to printer language, image processing, and image processing execution environment, in response to a capability information inquiry from the other device regarding capabilities containing at least one of memory capacity, processing relating to printer language, image processing, and image processing execution environment; and server processing means, wherein given processing is performed to printing data received from another network interface card connected to the network, and printing data following the given processing is transmitted to the other network interface card in response to transmission request from the other network interface card.

According to the present invention, the network interface card can behave as a server device, if necessary.

The server processing means of the network interface card according to the present invention contains conversion processing means for converting the printing data received from the other network interface card into printing data suitable for the printer to which the other network interface card is provided.

The conversion processing means of the network interface card according to the present invention converts into printing data suitable for the printer to which the other network interface card is provided, based on the device information received from the other network interface card.

The server processing means of the network interface card according to the present invention contains storage processing means for receiving printing data sent from the network interface card and storing this in the printer memory.

The server processing means of the network interface card according to the present invention contains image processing execution means for receiving the printing data and the image processing programs for performing image processing of the printing data sent from the other device, and performing image processing of the printing data using the image processing programs.

DETAILED DESCRIPTION OF THE EMBODIMENTS

Next, preferred embodiments of the present invention will be described in detail, based on the drawings.

(1) First Embodiment

The present embodiment is characterized in that connecting a network interface card to a network causes the network interface card related functions to increase. The functions are realized by a network interface card (hereafter referred to as a client network interface card) which has received a printing command from a personal computer (hereafter referred to as PC) commissioning another device (hereafter referred to as a server device) on the network to perform conversion processing into printing data suitable for the printer to which the network interface card is provided, and receives and prints the post-conversion data.

Figure 1:
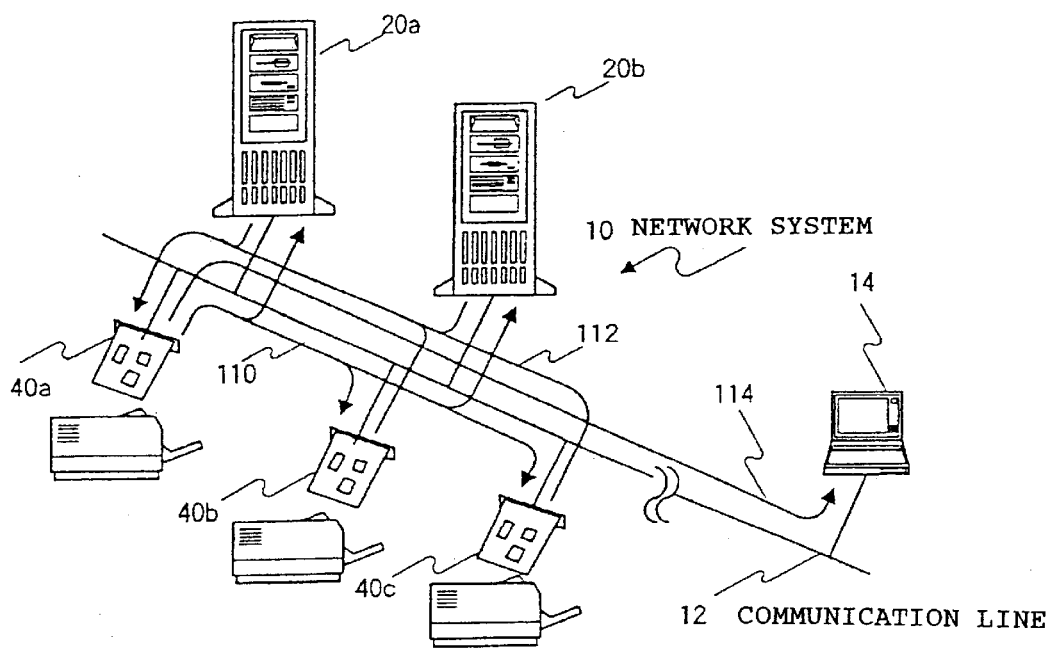
FIG. 1 is a schematic configuration diagram of a network system relating to a first embodiment.
Figure 2:
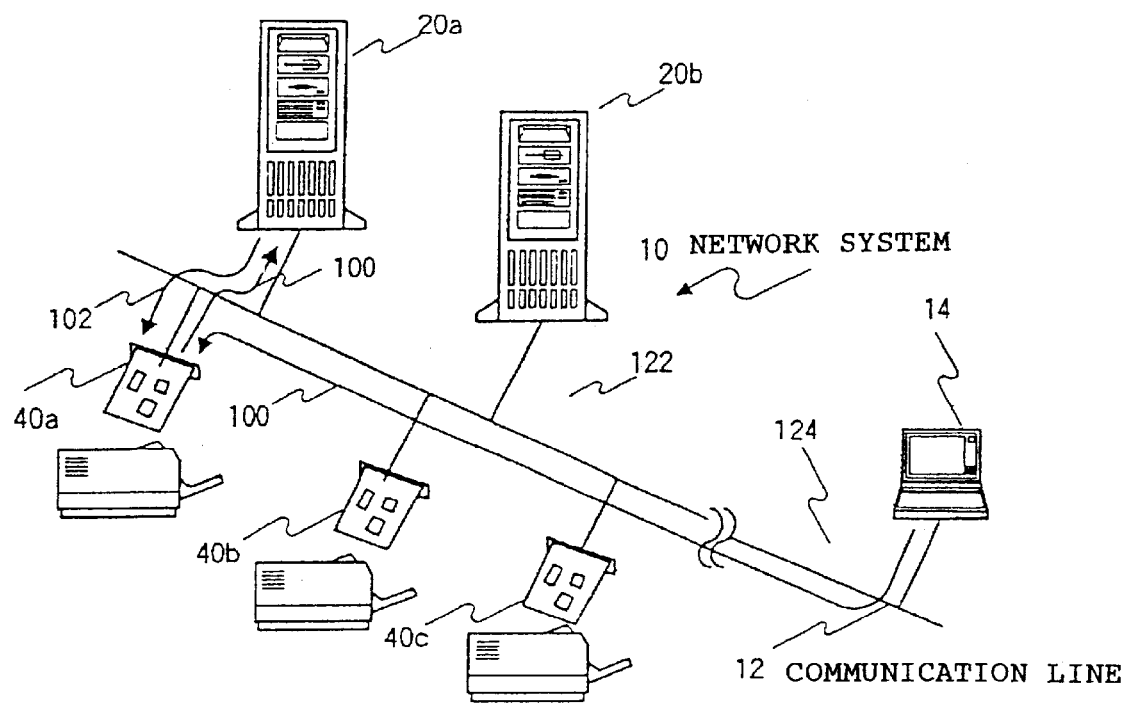
FIG. 2 is a schematic configuration diagram of a network system of the first embodiment.

FIG. 1 and FIG. 2 illustrate a schematic configuration of a first embodiment of the network interface card and the network system to which the network interface card is connected, according to the present invention.

As shown in the figures, connected to the network system 10 according to the present embodiment are multiple servers 20a and 20b connected via a communication line 12, and network interface cards 40a, 40b, 40c, . . . provided to multiple printers. Also, the network interface cards 40 are formed so as to be increased as to the communication line 12 if necessary.

Further, a PC 14 is connected to this network system 10 via the communication line 12.

The PC 14 is capable of accessing an external network system such as the Internet for example, via the communication line 12, and receiving data such as text, still images, motion images, audio, and so forth, which are information. Further, it is capable of taking in image data via various types of input/output media, and also generating image data by itself.

With the present embodiment, the network interface card 40a connected to the network system performs inquiry 110 of capability information relating a printer having at least one of processing relating to printer language, and image processing, as to the other devices 20a, 20b, 40b, 40c, . . . connected to the network, as shown in FIG. 1. The other devices 20a, 20b, 40b, 40c, . . . connected to the network, respond with the printer-related capability information 112 to the network interface card 40a, regarding the capability information inquiry.

The network interface card 40a judges whether there is another device which will support increasing the functions of the printer to which its own device is provided, based on the capability information 112 sent from the other devices connected to the network in response to the printer-related function capability information inquiry, and determines virtual printer information for the printer. Then, it discloses the virtual printer information 114 in response to request from the PC 14.

The PC 14 receives the virtual printer information 114, and upon making judgement that printing can be made, transmits printing data 100 containing printer commands created by a printer driver held by its own device, to the network interface card 40a. The network interface card 40a, upon receiving this printing data 100, determines from the multiple network interface cards 40 and servers 20 a server device which will perform conversion of the received printing data 100 into printing data 102 suitable for printing with the printer to which its own device is provided. For example, in the event that the server 20a is determined to be the server device, the network interface card 40a transmits the printing data 100 to the server 20a and commissions conversion processing. The server 20a, upon receiving the printing data 100, performs conversion processing. Then, upon a transmission request from the network interface card 40a, the server 20a transmits the post-conversion printing data 102 to the network interface card 40a. The network interface card 40a receives the post-conversion printing data 102 and performs printing output, as shown in FIG. 2.

Figure 3:
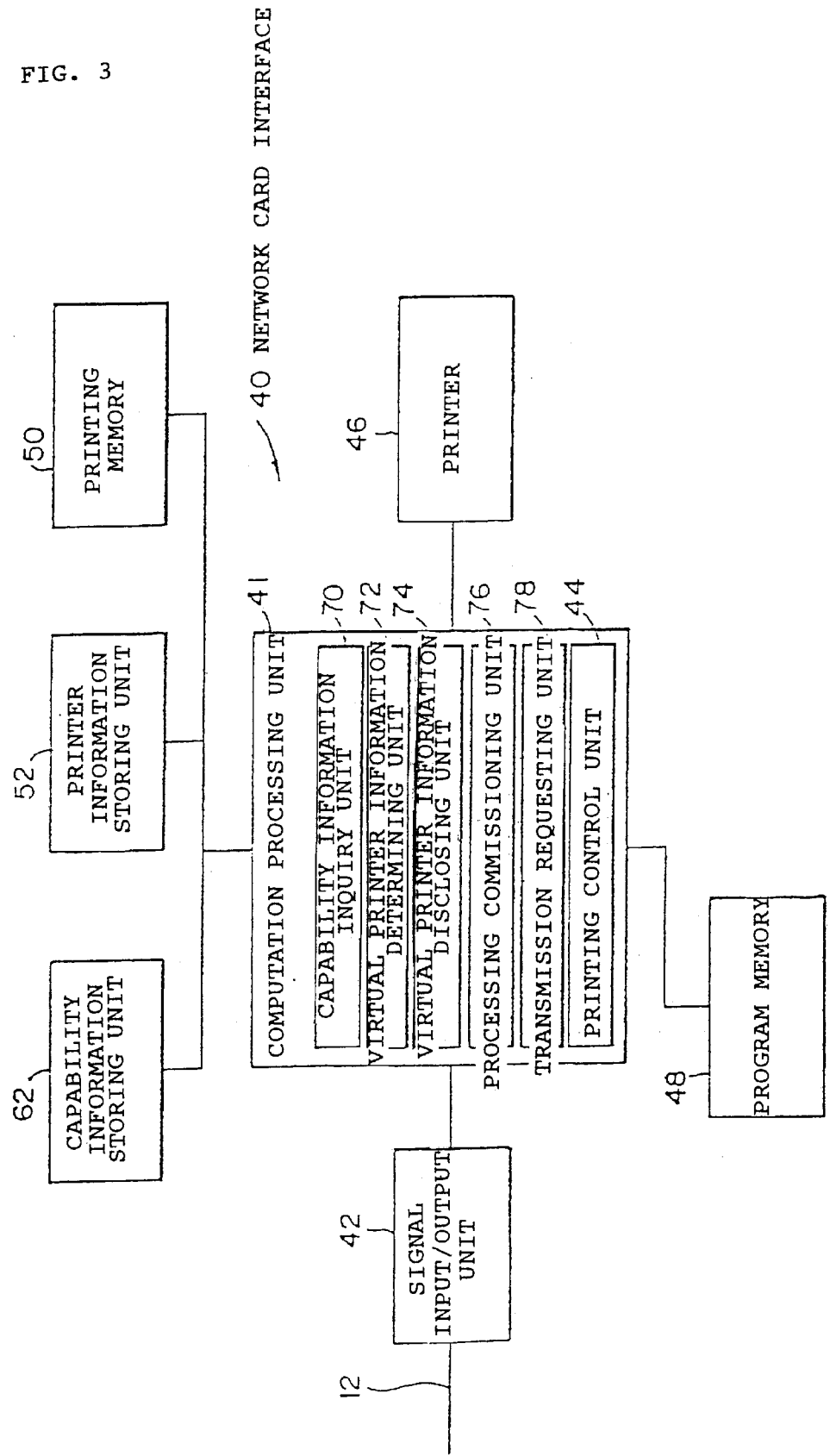
FIG. 3 is a function block diagram of a client network interface card of the first embodiment.

FIG. 3 shows a function block diagram of a device functioning as a client network interface card, as with the network interface card 40a.

The client network interface card according to the present embodiment is comprised of a signal input/output unit 42 connected to the communication line 12, a computation processing unit 41 configured of a CPU or the like, program memory 48 storing programs such as ESC/P processing programs and the like to operate as the printer to which the network interface card is provided, printing memory 50 for storing the printing data 100 transmitted from the PC 14, printer information storing unit 52 storing an ID for identifying the model number (model name) of the printer to which its own device is provided, and a capability information storing unit 62 storing capabilities including at least one of memory capacity of other devices on the network, processing relating to printer language, image processing, and image processing execution environment.

The computation processing unit 41 operates based on the programs stored in the program memory 48, and functions as a capability information inquiry unit 70, a virtual printer information determining unit 72, a virtual printer information disclosing unit 74, a processing commissioning unit 76, a transmission requesting unit 78, and a printing control unit 44.

The capability information inquiry unit 70 has functions of inquiring of other devices connected to the network regarding capability information including at least one of memory capacity, processing relating to printer language, image processing, and image processing execution environment. Then, the capability information from the other devices in response to the inquiry are correlated with the other devices, and stored in the capability information storing unit 62. This inquiry is performed in cases wherein its own device is connected to the network, and cases wherein new devices are connected to the network.

With the present embodiment, the capability information inquiry unit 70 inquires of other network interface cards connected to the network regarding capability information relating to printer-related functions including at least one of processing relating to printer languages, and image processing, and the capability information storing unit 62 stores the capability information relating to the printer-related functions.

The virtual printer information determining unit 72 judges whether there is another device which will support increasing the functions of its own device, based on the capability information sent from the other devices connected to the network in response to the capability information inquiry, and determines virtual printer information for its own device.

The virtual printer information disclosing unit 76 discloses the virtual printer information 114 in response to a request from the PC 14.

In the event that the printing commission of the printing data received from the PC 14 exceeds the original processing capabilities of its own device or of the printer to which its own device is connected, the processing commissioning unit 76 determines a server device to which to transmit the received printing data, based on the capability information stored in the capability information storing unit 62. Then, the printing data and device information of its own device are transmitted to the server device in real-time, thus commissioning the given processing. With the present embodiment, this given processing is conversion processing for converting the printing data received from the PC 14 into printing data suitable to its own device. Thus, the processing commissioning unit 76 determines the server device to perform the conversion processing for converting into printing data suitable for the printer, based on the capabilities information relating to the printer-related functions and the printing data received from the PC 14.

The transmission requesting unit 78 requests of the server device, transmission of the printing data following processing.

The printing control unit 44 is configured so as to write the printing data being transmitted from the server device into the printing memory 50 functioning as a buffer, and also to control the printer 46 so as to sequentially print out.

Figure 4:
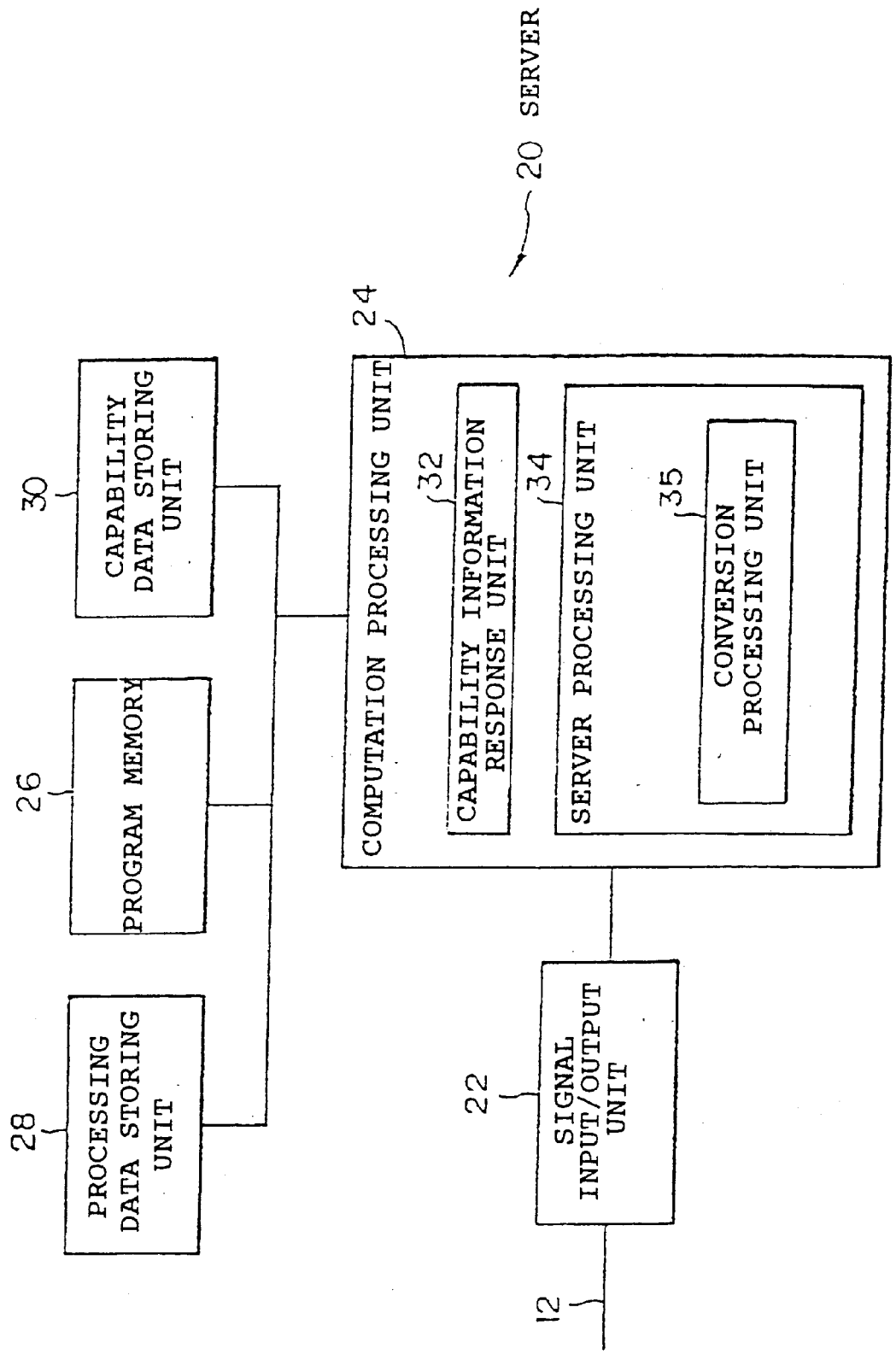
FIG. 4 is a function block diagram of a server device of the first embodiment.

FIG. 4 shows a function block diagram of a device functioning as a server device as with the server 20a.

The server device according to the present embodiment is configured of a signal input/output unit 22 for performing transmission and reception of data via the communication line 12, a computation processing unit 24 configured using a CPU or the like, program memory 26 storing various types of operating programs, a processing data storing unit 28 for storing at least one of printing data regarding which processing has been commissioned from the client network interface card and post-processing printing data, and a capability data storing unit 30 storing capability information unique to different types of network interface cards.

With the present embodiment, the processing data storing unit 28 stores at least one of printing data regarding which processing has been commissioned from the client network interface card, and post-processing printing data.

The program memory 26 also stores programs for performing data conversion processing such as processing relating to printer languages and image processing and the like, for the printing data regarding which data conversion processing has been commissioned.

Here, the capability data storing unit 30 stores version information of programs stored in the program memory 26, IDs which are device information for identifying the model of printer to which the network interface cards corresponding to the programs have been provided, and so forth. An ID, which is device information for identifying the model of printer to which a network interface card corresponding to a program has been provided, is, in the event of an image processing program for example, device information of a printer suitable to print generated data, or in the event of printer language conversion processing, device information of a printer to which is provided a network interface card capable of printing printing data containing generated printer commands, and so forth.

The computation processing unit 24 operates based on operation programs and the like stored in the program memory 26, and functions as a capability information response unit 32 and server processing unit 34.

The capability information response unit 32, in response to the capability information inquiry from the client network interface card, responds with capability information of capabilities including at least one of memory capacity of its own device, processing relating to printer language, image processing, and image processing execution environment, to the client network interface card.

With the present embodiment, response is made to the client network interface card regarding capability information of printer-related functions including at least one of printer language related processing and image processing, stored in the capability data storing unit 30. Capability information of printer language related functions is information of whether or not there are programs for performing image processing and printer language related processing and the like, version information, and so forth.

The server processing unit 34 performs given processing on the printing data received from the client network interface card, and performs control so as to transmit the printing data following the given processing to the network interface card in response to transmission requests from the network interface card.

The present embodiment includes a conversion processing unit 35 for performing given processing. The conversion processing unit 35 determines the program to be used for conversion processing regarding the printing data received from the client network interface card, based on the printing data and the device information of the network interface card, making reference to the capability data storing unit 30. Then, the printing data is subjected to conversion processing using the corresponding program stored in the program memory 26.

Figure 5:
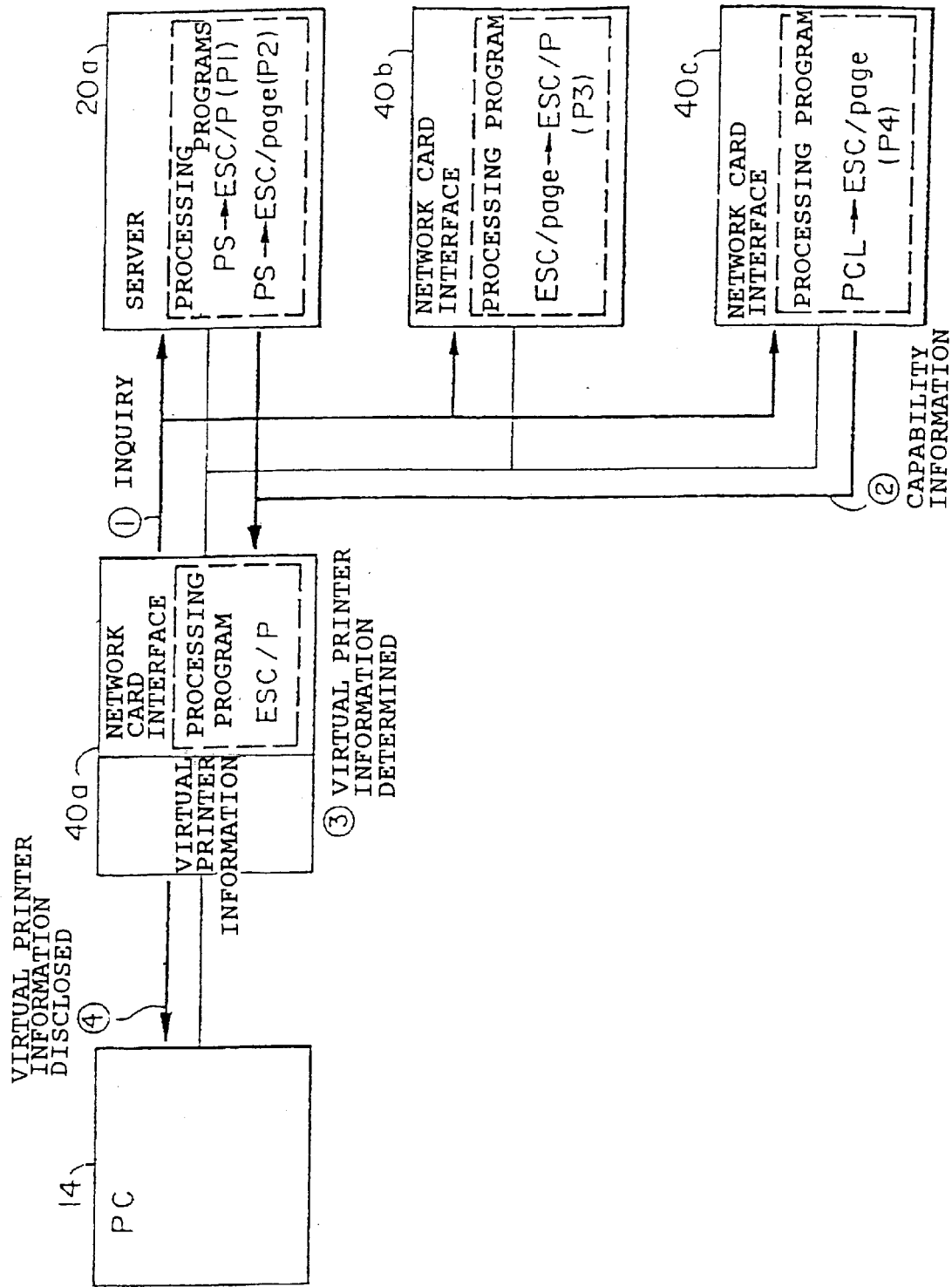
FIG. 5 is a diagram for description of a detailed operation example of the first embodiment.
Figure 6:
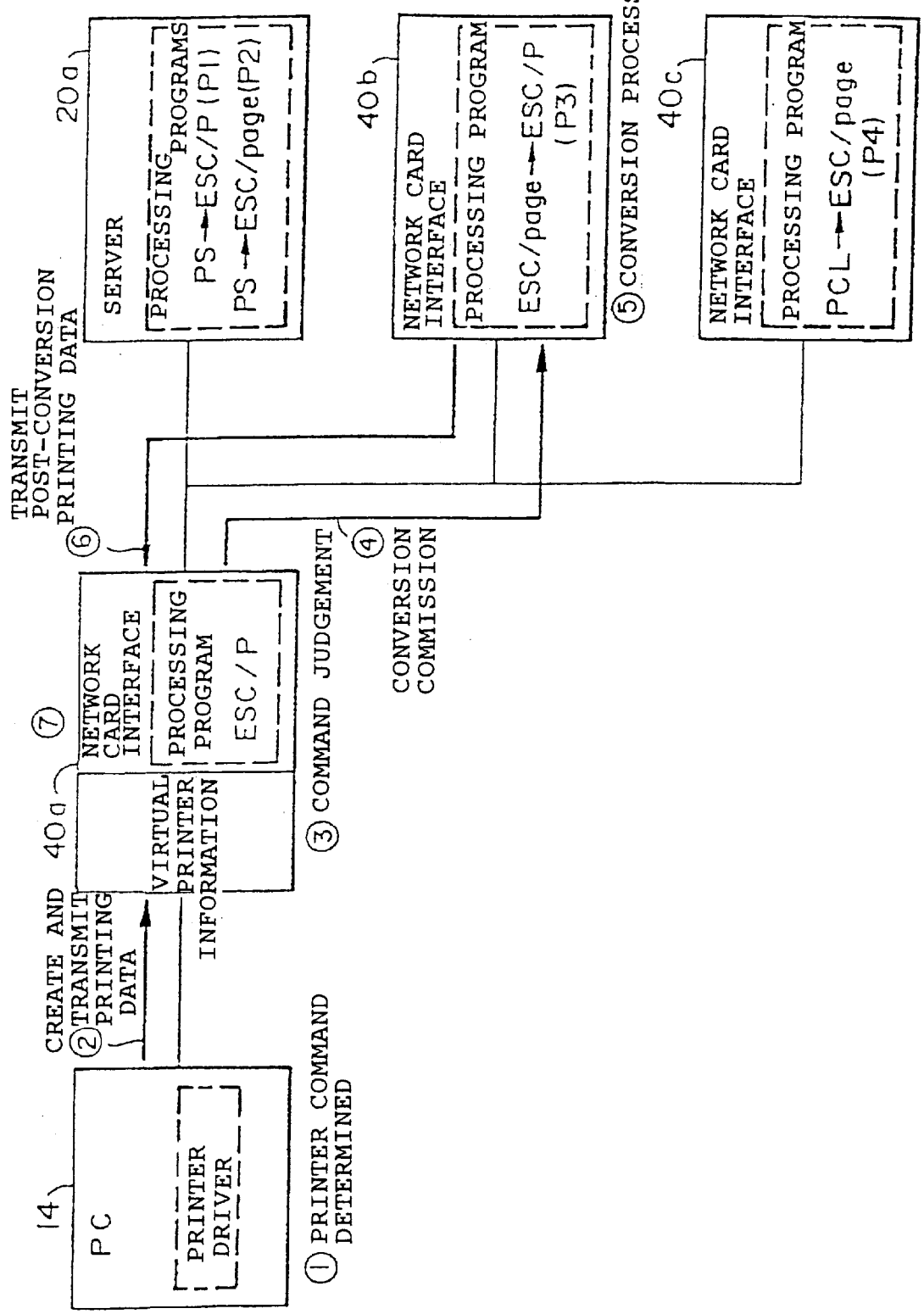
FIG. 6 is a diagram for description of a detailed operation example of the first embodiment.
Figure 7:
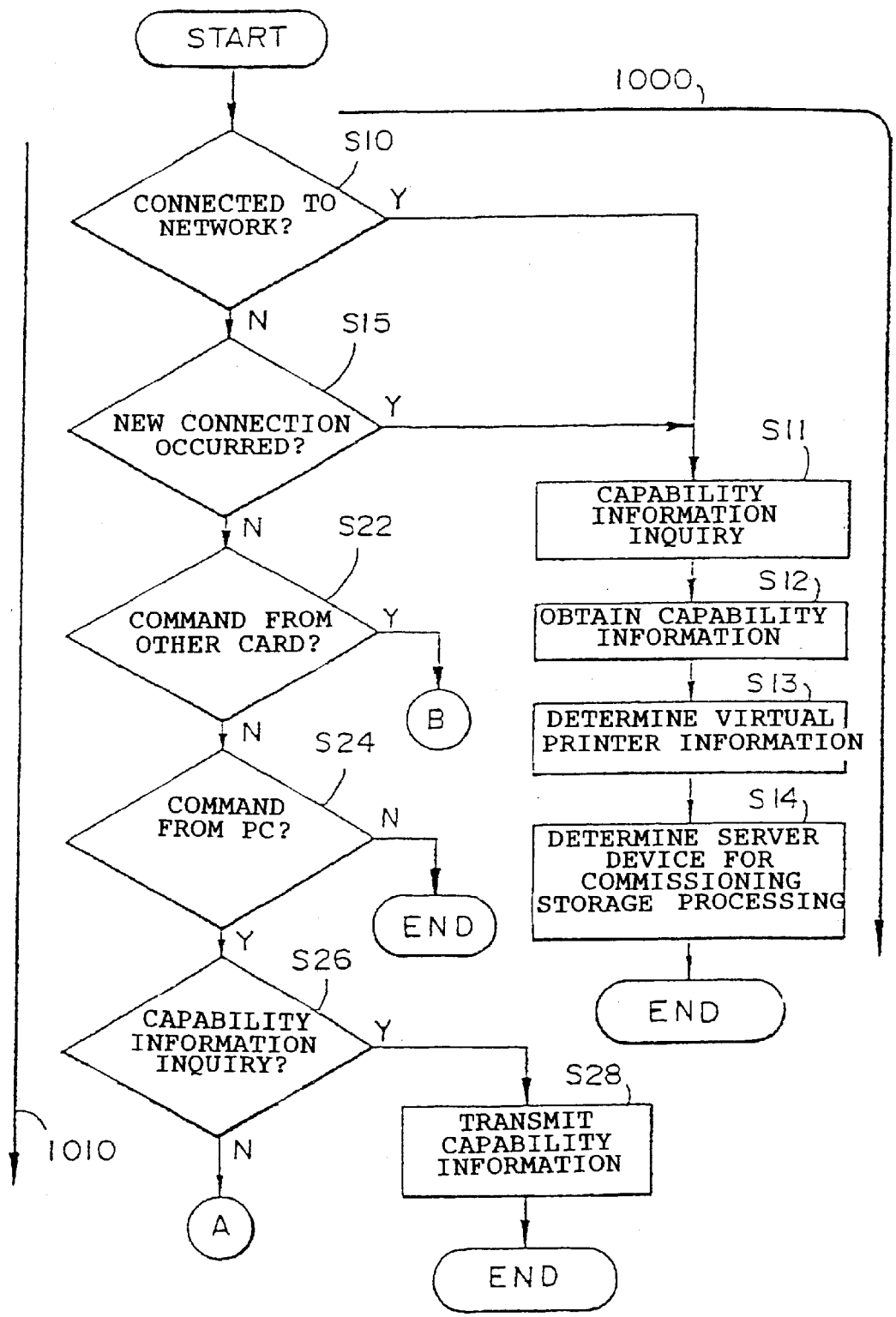
FIG. 7 is a flowchart for description of detailed operations of the present invention.
Figure 8:
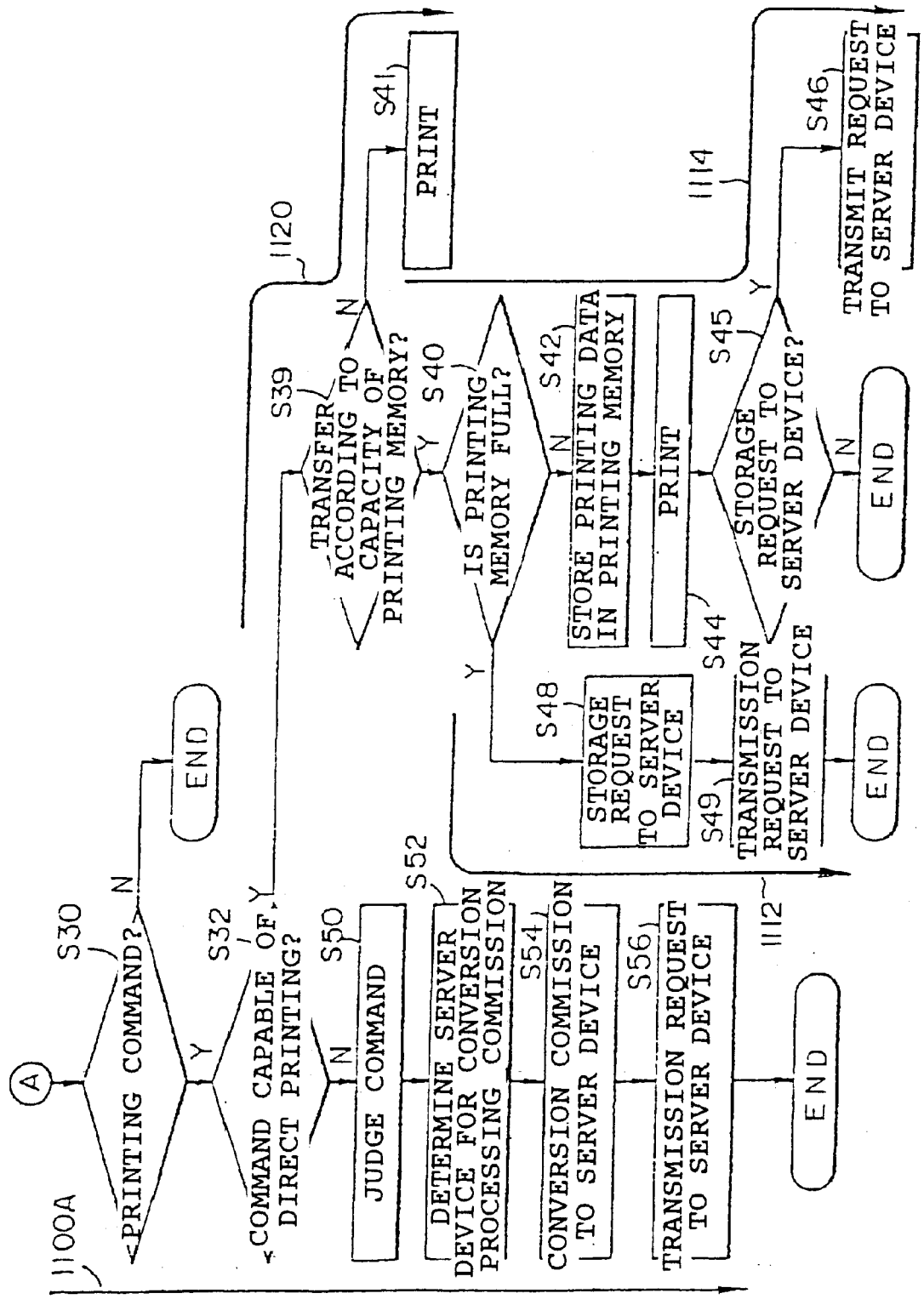
FIG. 8 is a flowchart for description of detailed operations of the present invention.
Figure 9:
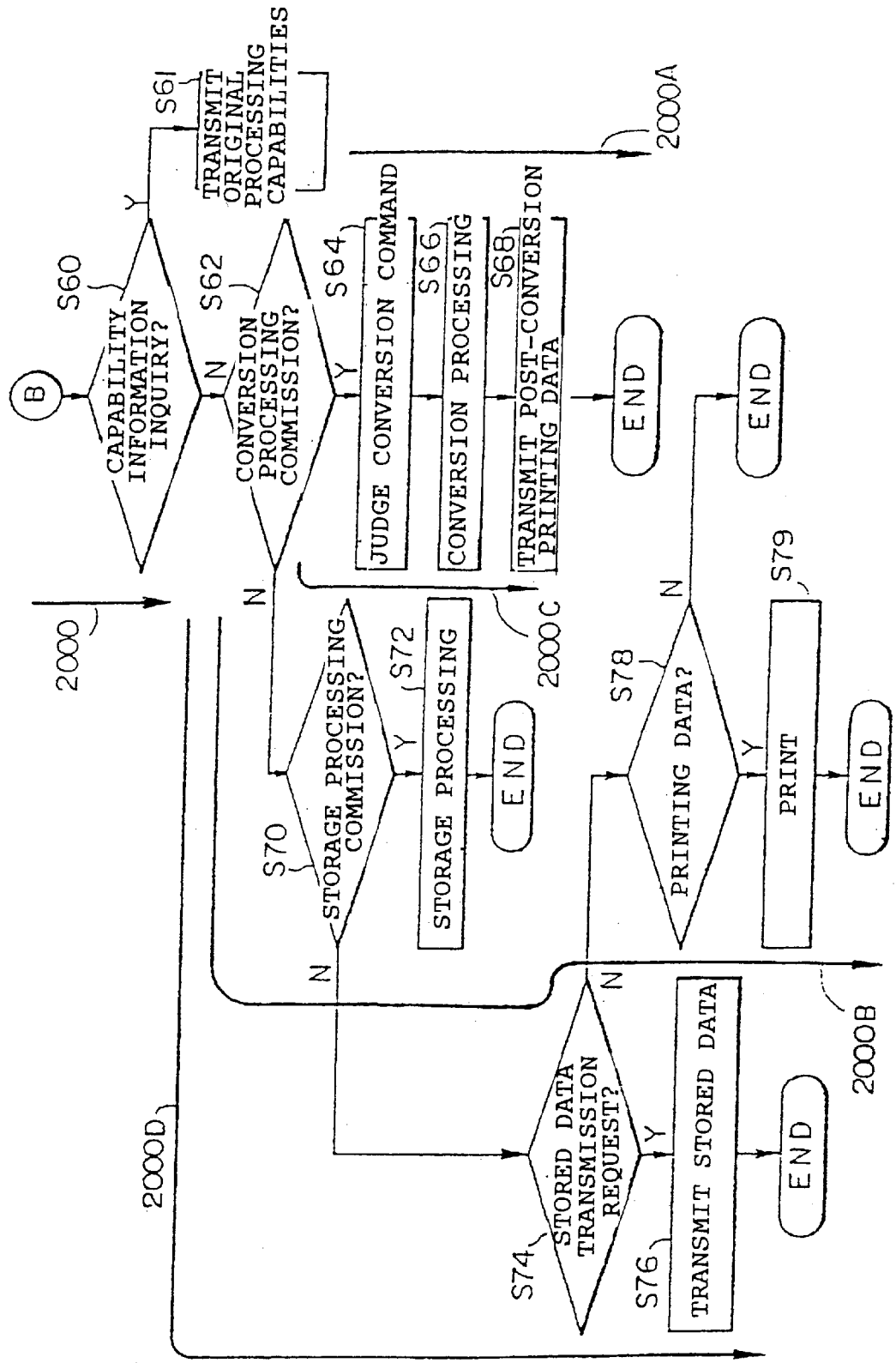
FIG. 9 is a flowchart for description of detailed operations of the present invention.

Next, a more detailed operating example of the network interface card and network system 10 according to the present embodiment will be described. FIG. 5 and FIG. 6 are diagrams for describing more detailed operating example of the network interface card and network system 10 according to the present embodiment. FIG. 7, FIG. 8, and FIG. 9 are flowcharts describing the operation of the network interface card according to the present embodiment.

The flowcharts shown in FIG. 7, FIG. 8, and FIG. 9 shown an example of an operation in the event that the network interface card has both the functions of a client network interface card and the functions of a server device. In the flowcharts shown in FIG. 7, FIG. 8, and FIG. 9, the operations of the network interface card behaving as a client network interface card and the operations thereof behaving as a server device are illustrated.

First, an operation example wherein the client network interface card determines the virtual printer information and discloses this to the PC 14 will be described.

In FIG. 5, let us say that the network interface card 40a to serve as the client network interface card is an ESC/P printer as for the original capabilities of the printer to which its own device is provided. With such arrangements, only the functions of an ESC/P printer are had before connection to the network. Accordingly, in the event that the PC 14 desires to print with the network interface card 40a, there is the need to transmit printing data containing print commands which can be processed by an ESC/P printer.

However, by means of connecting the network interface card 40a to the network 10, virtual printer information with increased capabilities can be disclosed to the PC 14. The operation of the network interface card 40a at the time of determining and disclosing this virtual printer information is shown in flows 1000 and 1010 of FIG. 7.

First, the capability information inquiry unit 70 of the network interface card 40a makes inquiry regarding printer related capability information to other devices on the network (step S11).

In response to the above inquiry, the network interface card 40a obtains the capability information from the other devices on the network (step S12). For example, in FIG. 5, capability information that the server 20a obtains has a processing program (P1) for converting PS-compatible printing data into ESC/P-compatible printing data, and a processing program (P2) for converting PS-compatible printing data into ESC/page-compatible printing data, capability information that the network interface card 40b has a processing program (P3) for converting ESC/page-compatible printing data into ESC/P-compatible printing data, and capability information that the network interface card 40c has a processing program (P4) for converting PCL-compatible printing data into ESC/page-compatible printing data, is obtained.

The virtual printer information determining unit 72 of the network interface card 40a judges whether or not there is another device which will support increasing the capabilities of its own device, based on the capability information of printer related functions, and determines the virtual printer information of its own device (step S13). In FIG. 5, the printer to which the network interface card 40*a* is provided is an ESC/P printer, so virtual printer information to the effect that the printer is a printer capable of processing the given printer commands and printer language and the like is determined, in the event that there is a processing program for converting the given printer commands and printer language and the like into ESC/P-compatible printing data. Accordingly, virtual printer information can be determined wherein the printer to which the network interface card 40*a* is provided can behave as a PS printer and ESC/page printer, due to the processing program (P1) and processing program (P3).

Then, in the event that there is a printer related function capability information inquiry from the PC 14, the virtual printer information is disclosed to the PC 14 (steps S24 through S28).

In FIG. 6, an operating example of the client network interface card commissioning conversion of the printing data received from the PC 14 to the server device, and performing printing output of the post-conversion printing data, will be described.

Operations of the network interface card 40*a* at the time of commissioning conversion are shown in flow 1100A in FIG. 8, operations of the server device which has received the conversion request are shown in 2000A of FIG. 9, and operations of the network interface card 40*a* printing the data following conversion are shown in flow 1120 in FIG. 8.

The PC 14 determines the printer commands for sending the printing data to the network interface card 40*a*, based on the virtual printer information of the network interface card 40*a* and the printer driver functions of its own device.

Then, printing data containing printer commands is created with the printer driver, and this is transmitted to the network interface card 40*a*. Let us say that printing data capable of printer with an ESC/page printer has been transmitted, for example.

The network interface card 40*a* which has received the printing data judges whether the received printer commands can be directly printed with the printer to which its own device is mounted. Here, the only data which the printer to which the network interface card 40*a* is provided can print is in the event that printing data corresponding to ESC/P is received.

However, the received is data which can be printed with an ESC/page printer, and thus cannot be directly printed. Accordingly, the conversion processing commissioning unit 76 determines a server device to commission conversion process wherein the ESC/page-compatible printing data is converted into printing data which can be printed with an ESC/P printer, based on the capability information, and the received printing data and device information of its own device are transmitted to the server device, thereby commissioning the conversion processing. Here, transfer is made to the network interface card 40*b* which has the processing program (P3) for converting ESC/page-compatible printing data into ESC/P-compatible printing data, and the conversion processing is commissioned (steps S50 through S54).

The conversion processing commissioning unit 76 of the network interface card 40*b* which is the server device which has been commissioned with the conversion processing determines to perform the conversion processing using the processing program (P3), based on the printing data sent from the network interface card 40*a* and the device information of the printer to which the network interface card is provided, and performs the conversion processing of converting the received printing data into printing data which the network interface card 40*a* can directly print, using the processing program (P3). Here, ESC/page-compatible printing data is converted into ESC/P-compatible printing data (step S62 through S66 in FIG. 9).

Then, the conversion processing commissioning unit 76 transmits (step S68 in FIG. 9) the post-processing printing data to the network interface card 40*a* in response to a transmission request (step S56 in FIG. 8) from the transmission request unit 78 of the network interface card 40*a*.

The network interface card 40*a*, upon receiving the post-processing printing data, performs printing based on the printing data (steps S39 and S49 in FIG. 8)

According to the present embodiment, the network interface card 40*a* discloses virtual printer information regarding how its own device can behave on the network, to the PC 14. This virtual printer information has taken in the capabilities of other devices connected to the network in addition to the original capabilities of its own device. Thus, functions exceeding the original capabilities can be achieved by connecting the printer to the network. Also, the client network interface card can realized functions exceeding the original capabilities of its own device, by commissioning processing to other server devices connected to the network, thereby realizing a printer with markedly improved functions without increasing costs of the printer itself. Incidentally, a server or a network interface card for example can be a server device, as long as the device has the functions of a server device.

Also, the PC 14 can commission printing processing to the printer with increased capabilities. This is advantageous in that the restrictions of the computer sending data to the printer for printing are reduced.

(2) Second Embodiment

The present embodiment is characterized in that connecting a network interface card to a network causes the memory capacity related functions to increase. The functions are realized by a network interface card (hereafter referred to as a client network interface card) which has received a printing command from a personal computer (hereafter referred to as PC) commissioning another device (hereafter referred to as a server device) on the network to perform storage processing of the received printing data, and the server device receives and prints the stored data.

Figure 10:
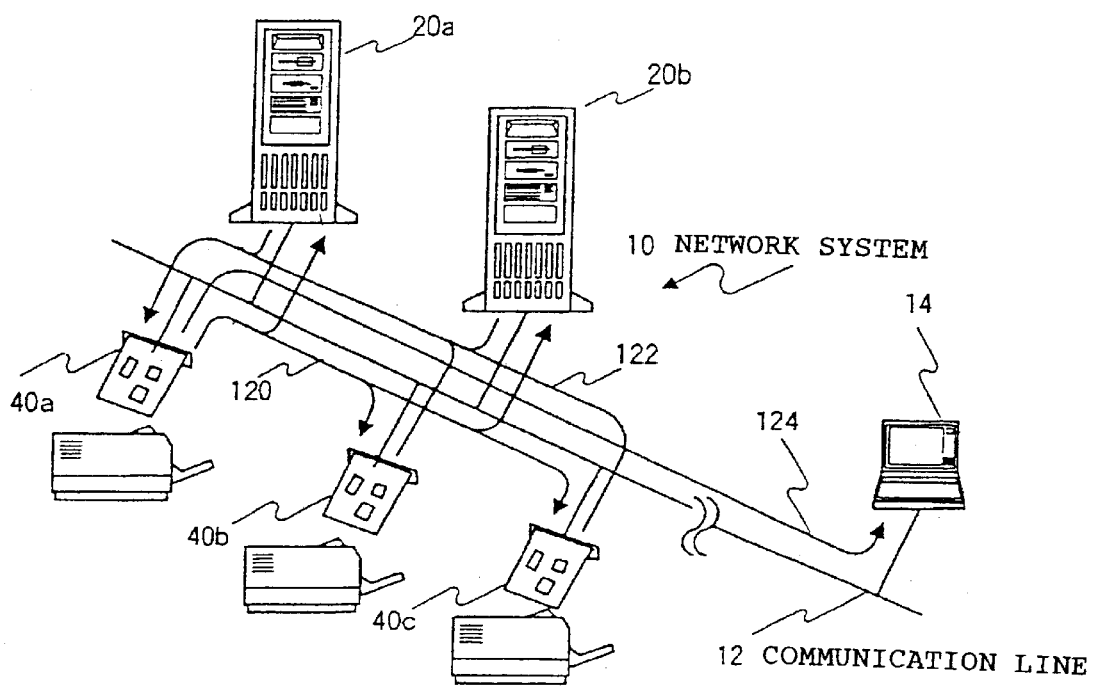
FIG. 10 is a schematic configuration diagram of a network system of a second embodiment.
Figure 11:
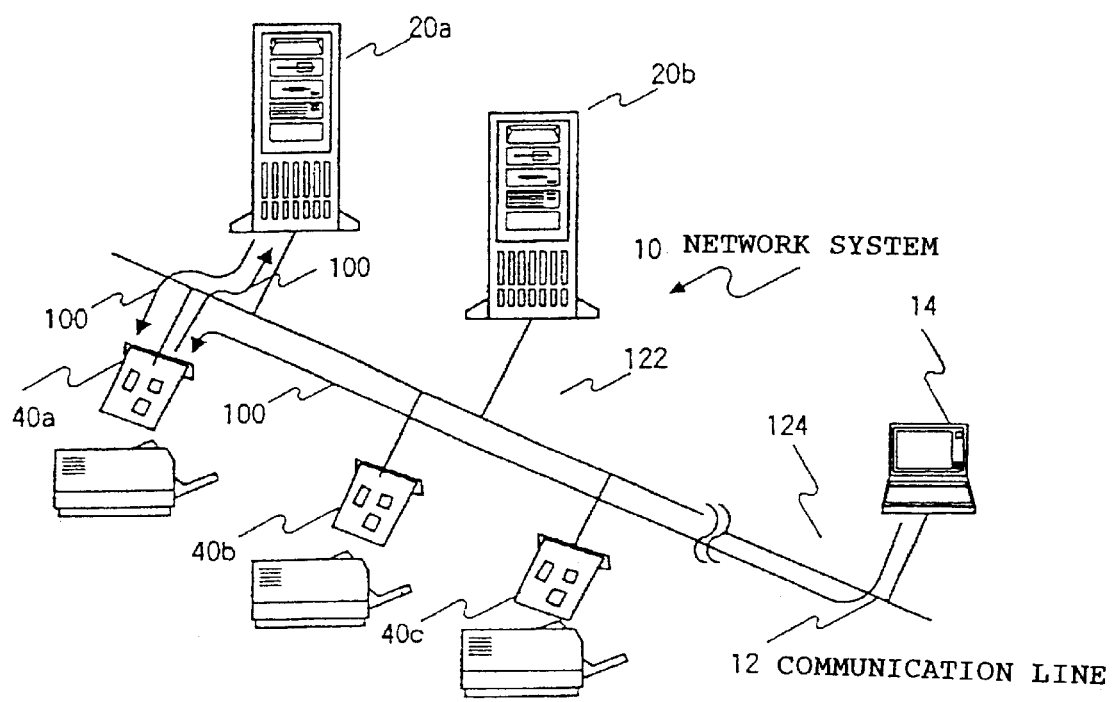
FIG. 11 is a schematic configuration diagram of a network system of the second embodiment.

FIG. 10 and FIG. 11 illustrate a schematic configuration of a second embodiment of the network interface card and the network system to which the network interface card is connected, according to the present invention. The equipment configuration in FIG. 10 and FIG. 11 is basically the same as that in FIG. 1 and FIG. 2.

With the present embodiment, processing is performed by transferring the received printing data to a server device having memory capacity great enough to store the received printing data, and thus there is the need for a device having memory capacity great enough to store the received printing data to be connected to the network system.

The client network interface card here will be the network interface card 40*a*. The network interface card 40*a* performs inquiry 120 of capability information relating memory capacity, as to the other devices 20*a*, 20*b*, 40*b*, 40*c*, . . . connected to the network, as shown in FIG. 10. The other devices 20*a*, 20*b*, 40*b*, 40*c*, . . . connected to the network, respond with the memory capacity related functions information 122 of their own devices to the network interface card 40*a*, regarding the capability information inquiry.

The network interface card 40*a* determines a server device having sufficient memory capacity for storing the printing data being sent from the PC 14 to commission the storing processing to, based on the capability information sent from the other devices connected to the network in response to the memory capacity related capability information inquiry. This will be the server device 20a. Then, it discloses to the PC 14 the virtual printer information 124 stating that the memory capacity of the server device is memory capacity capable of storage at its own device.

The PC 14 receives the virtual printer information 124, and upon making judgement that high-speed printing can be made, transmits printing data 100 containing printer commands created by a printer driver held by its own device, to the network interface card 40a, as shown in FIG. 11. Now, for the purpose of description, let us say that the printing data being transmitted contains printer commands capable of being printed with the original capabilities of the printer to which the network interface card 40a is provided.

The network interface card 40a, upon receiving this printing data 100, transfers the received printing data to the server 20a, and commissions the storing processing.

The server 20b, upon receiving this printing data 100, stores this in memory of its own device. Then, upon a transmission request from the network interface card 40a, it transmits the printing data 100 to the network interface card 40a. The network interface card 40a performs printing output of the received printing data 100.

Figure 12:
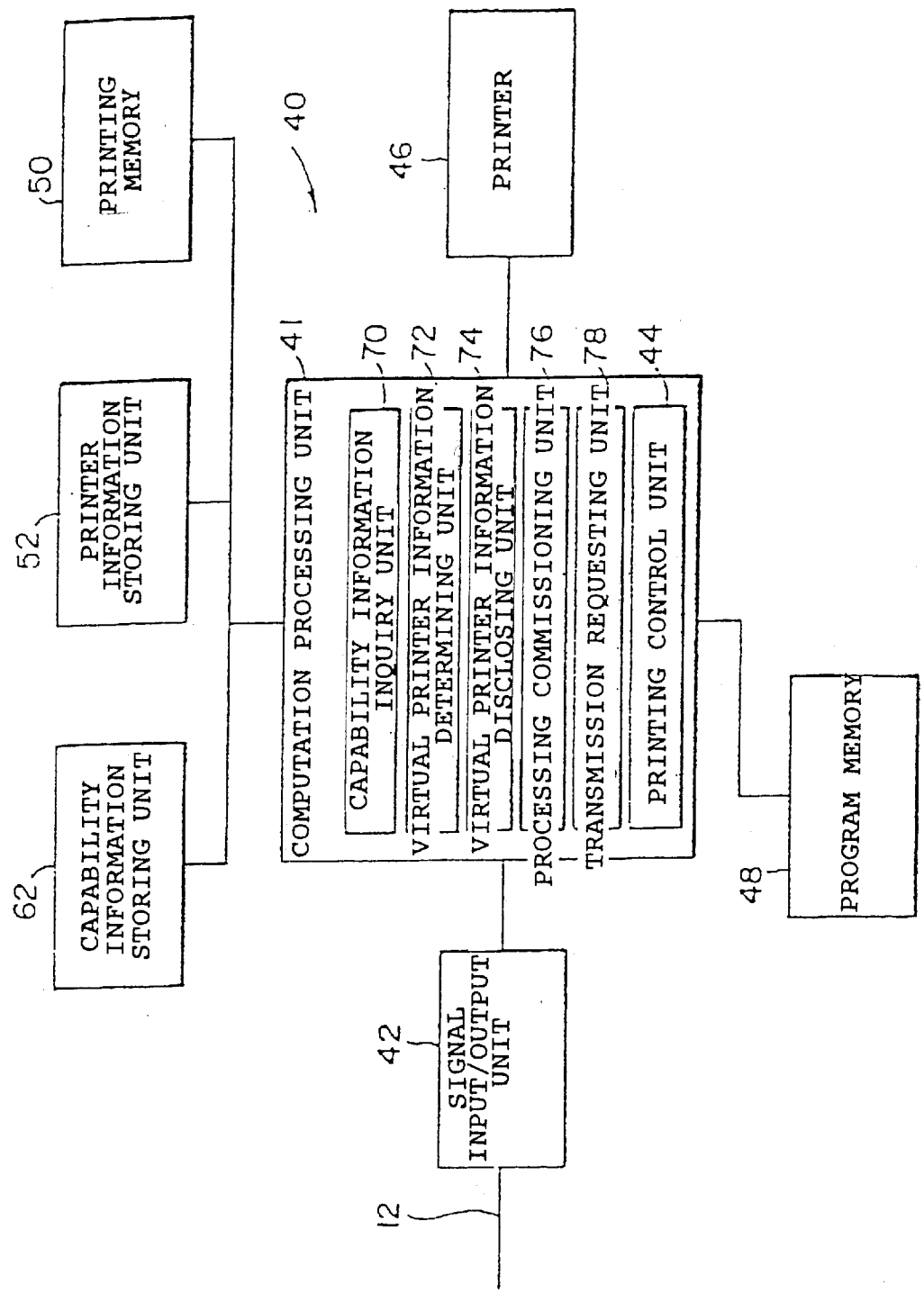
FIG. 12 is a function block diagram of a client network interface card of the second embodiment.

FIG. 12 shows a function block diagram of a device functioning as a client network interface card, as with the network interface card 40a. In FIG. 12, parts which have the same types of functions as those in the function block diagram of the client network interface card shown in FIG. 3 are denoted with the same reference numerals.

The client network interface card according to the present embodiment is comprised of a signal input/output unit 42 connected to the communication line 12, a computation processing unit 41 configured of a CPU or the like, program memory 48, printing memory 50, a printer information storing unit 52, and a capability information storing unit 62.

The computation processing unit 41 operates based on the programs stored in the program memory 48, and functions as a capability information inquiry unit 70, a virtual printer information determining unit 72, a virtual printer information disclosing unit 74, a processing commissioning unit 76, a transmission requesting unit 78, and a printing control unit 44.

With the present embodiment, the capability information inquiry unit 70 has functions of inquiring of other devices connected to the network regarding capability information of memory capacity, and the capability information storing unit 62 stores the capability information relating to the memory capacity.

With the present embodiment, the given processing which the processing commissioning unit 76 commissions is storing processing for storing printing data received from the PC 14. Accordingly, the processing commissioning unit 76 determines a server device for commission the storing processing, based on the memory capacity related capability information.

Incidentally, in the event of executing printing and transfer of the printing data to the server device in parallel, the processing commissioning unit 76 stores the printing data sent from the PC 14 in the printing memory 50 of its own device until there is no more empty memory, and after there is no more empty printing memory in the printing memory 50 of its own device, performs control so as to transfer the received printing data to the server device in real-time. The transmission requesting unit 78 requests transmission of the printing data which its own device has transmitted to the storage processing device, according to the state of empty printing memory in the printing memory 50 due to printing. Then, the printing control unit 44 performs control so as to sequentially receive the printing data transferred before, and stores this in the printing memory of its own device.

Figure 13:
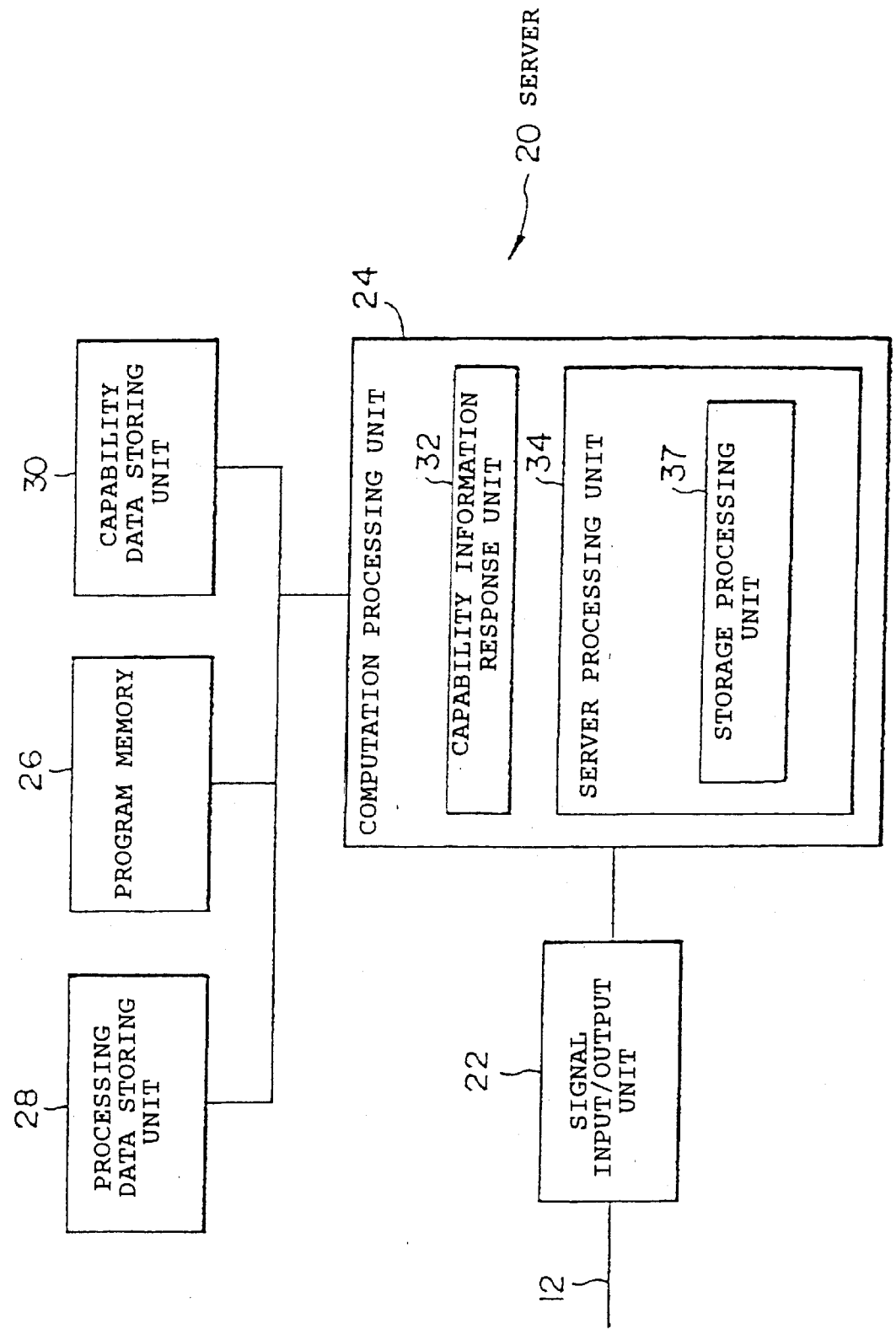
FIG. 13 is a function block diagram of a server device of the second embodiment.

FIG. 13 shows a function block diagram of a device functioning as a server device, as with the server 20b. In FIG. 13, parts which have the same types of functions as those in the function block diagram of the server device shown in FIG. 4 are denoted with the same reference numerals.

The server device according to the present embodiment is comprised of a signal input/output unit 22 which performs input and output of data via the communication line 12, a computation processing unit 24 configured of a CPU or the like, program memory 26, a processing data storing unit 28, and a capability data storing unit 30.

The processing data storing unit 28 stores the printing data regarding which the storage commission has been received.

The capability data storing unit 30 stores capability information relating to the memory capacity of its own device.

The computation processing unit 24 contains a capability information response unit 32 and server processing unit 34.

The capability information response unit 32, in response to the capability information inquiry relating to memory capacity from the client network interface card, responds with capability information of the memory capacity of its own device, stored in the capability data storing unit 30, to the client network interface card.

The server processing unit 34 contains a storage processing unit 37, and stores the printing data sent from the client network interface card in the processing data storage unit 28, and transmits the stored printing data to the client network interface card, in response to transmission requests from the client network interface card.

Figure 14:
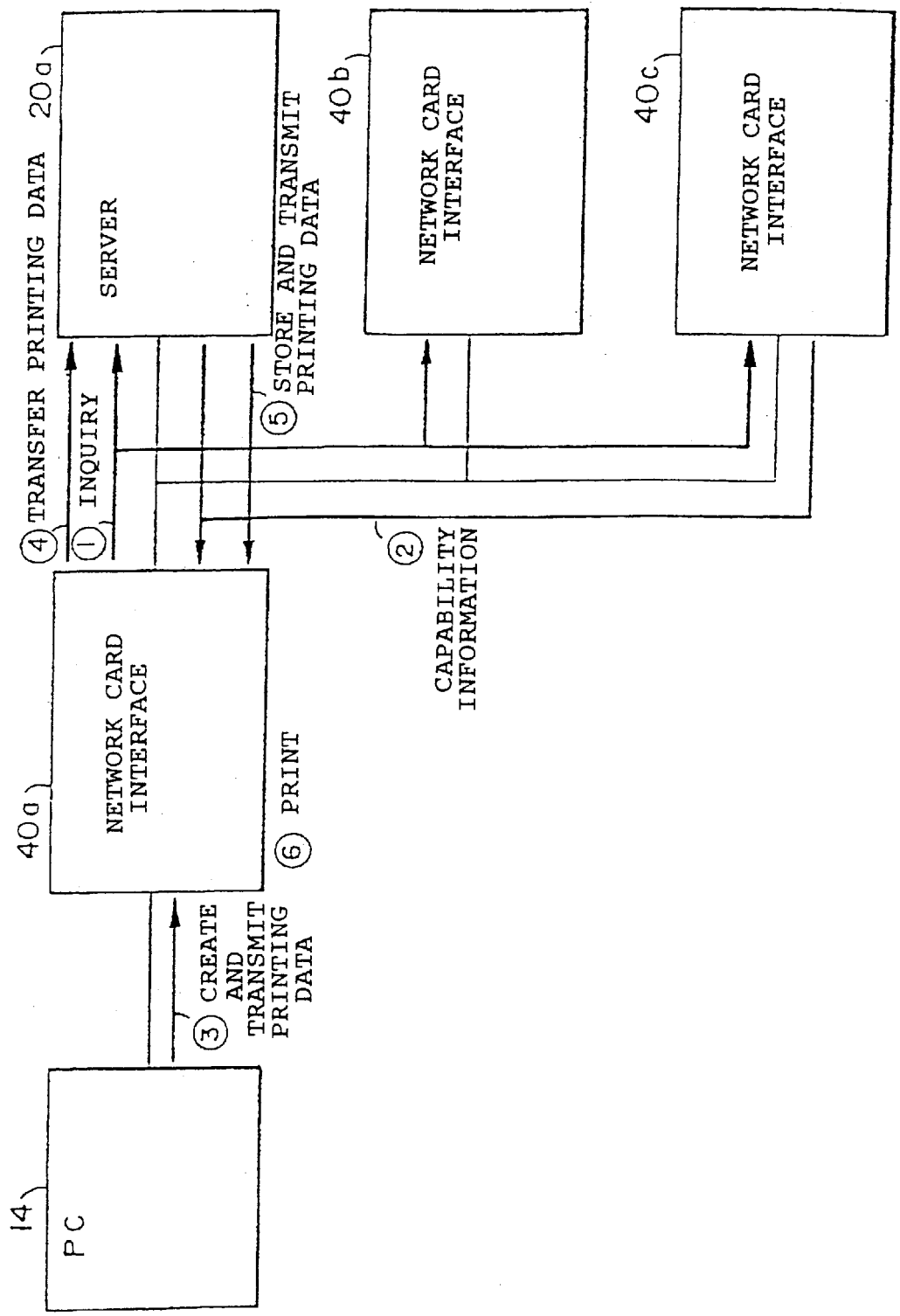
FIG. 14 is a diagram for description of a detailed operation example of the second embodiment.

Next, a more detailed operating example of the network interface card and network system 10 according to the present embodiment will be described, with reference to FIG. 14 and the flowcharts in FIG. 7, FIG. 8, and FIG. 9. FIG. 14 is a diagram for describing a more detailed operating example of the network interface card and network system 10 according to the present embodiment.

In FIG. 14, the printer to which is provided the network interface card 40a serving as the client network interface card is an ink-jet type printer, and only has printing memory for storing one line worth of printing data. In such a case, the printing data can only be transmitted according to the printing speed of the network interface card 40a, and thus release of the PC is delayed.

However, the PC can perform transmission of data regardless of the printing speed of the network interface card 40a, by means of the network interface card 40a commissioning a storage processing device on the network 10 to store the received printing data. The operation of the network interface card 40a at the time of determining the server device to commission this storing processing to and commissioning storage is shown in flow 1000 of FIG. 7, flow 1112 and flow 1114 of FIG. 8, and 2000B in FIG. 9. Also, the operation of the server device which has received the storing commission is shown in 2000C of FIG. 9.

First, the capability information inquiry unit 70 of the network interface card 40a makes a capability information inquiry to the other devices on the network relating to memory capacity (this processing is also performed in step S11 in FIG. 7).

In response to the above inquiry, the capability information inquiry unit 70 obtains the capability information from the other devices on the network, and the processing commission unit 76 determines the server device to which to transfer printing data, based on the capability information (steps S12 and S13 in FIG. 7). Let us say here that the server 20a has been determined to be the server device.

Let us say that the PC 14 has transmitted printing data which contains printer commands capable of being directly printed with the original capabilities of its own device of the network interface card 40a.

The processing commission unit 76 of the network interface card 40a transfers the printing data sent from the PC 14 to the server 20a which is the server device (step S48 in FIG. 8. Also, in the event of executing printing and transfer of printing data to the server device in parallel, the processing in flow 1114 in FIG. 8 is executed).

The server device processing unit 34 is the server 20a which has received the storing commission receives the printing data sent from the network interface card 40a, stores this in the processing data storing unit 28, and transmits the printing data to the network interface card 40a, in response to transmission request from the network interface card 40a (flow 2000C and flow 2000D in FIG. 9).

The network interface card 40a which has received the printing data from the server device performs printing of the printing data (2000B in FIG. 9. Also, the printing of the printing data at the first part not transferred to the server device in the case of executing printing and transfer of printing data to the storage processing device in parallel, is performed in step S40, S42, and S44 in FIG. 8).

According to the present embodiment, the client network interface card can realize functions of memory capacity greater than that originally of its own device, by commissioning the storing processing to another server device connected to the network, thereby realizing a printer with markedly improved functions regarding memory capacity, without increasing costs of the printer itself.

Also, the PC 14 can commission printing processing to the client printer with increased memory capacity. Thus, the PC 14 is not under restrictions of the printing speed of the client printer. Accordingly, the transmission of data from the PC 14 to the client printer is completed in a short time, thereby speeding up the release of the PC 14.

(3) Third Embodiment

The present embodiment is characterized in that connecting a network interface card to a network causes the image processing execution environment related functions to increase. The functions are realized by a network interface card (hereafter referred to as a client network interface card) which has received a printing command from a personal computer (hereafter referred to as PC) transmitting received printing data and image processing programs held by its own device to another device (hereafter referred to as a server device) having an image processing execution environment on the network and commissioning image processing thereof, and receiving and printing the post-conversion data.

The present embodiment differs from the image processing commissioning to a server device in the first embodiment in that the client network interface card transmits image processing programs along with printing data.

Figure 15:
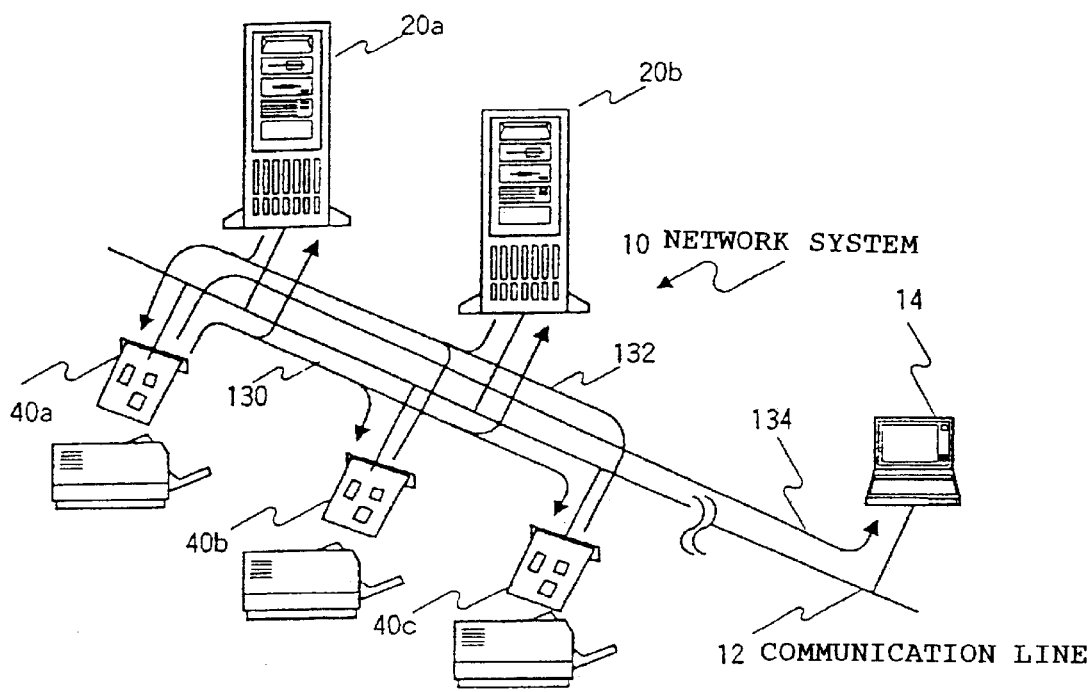
FIG. 15 is a schematic configuration diagram of a network system relating to a third embodiment.
Figure 16:
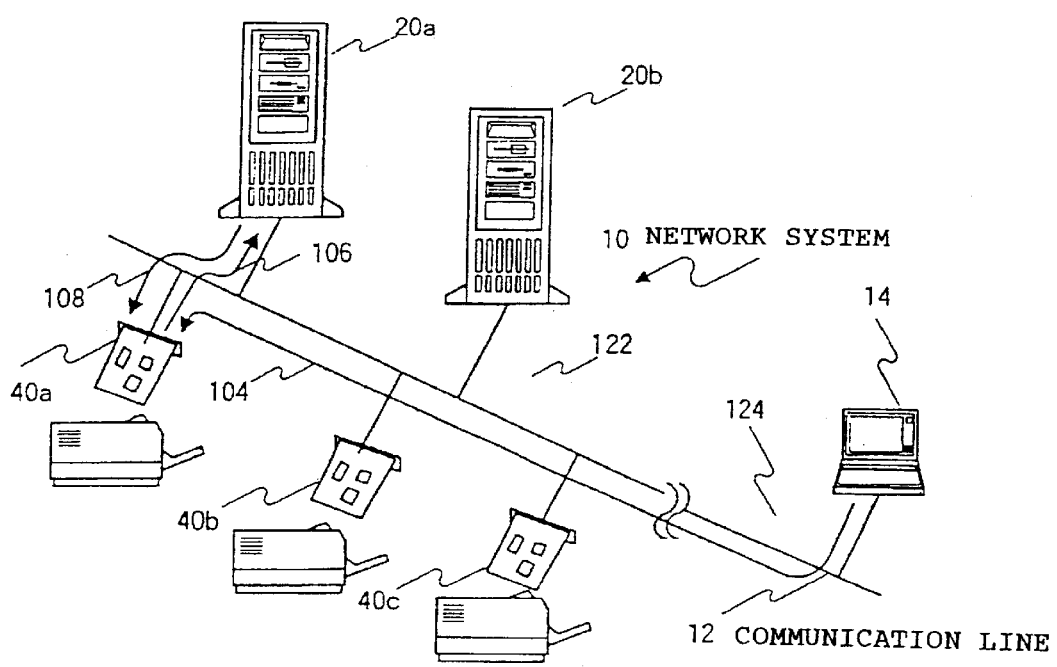
FIG. 16 is a schematic configuration diagram of a network system of the third embodiment.

FIG. 15 and FIG. 16 illustrate a schematic configuration of a third embodiment of the network interface card and the network system to which the network interface card is connected, according to the present invention.

The equipment configuration the present embodiment is basically the same as that in FIG. 1 and FIG. 2, but there is the need for a device having an image processing execution environment capable of serving as a server device to exist on the network.

Let us say that the client network interface card is the network interface card 40a. As shown in FIG. 15, the network interface card 40a connected to the network system performs inquiry 130 of capability information relating to image processing execution environment, as to the other devices 20a, 20b, 40b, 40c, . . . connected to the network. The other devices 20a, 20b, 40b, 40c, . . . connected to the network, respond with image processing execution environment related capability information 132 of their own devices to the network interface card 40a, regarding the capability information inquiry.

The network interface card 40a determines a server device having an environment capable of executing the image processing of the printing data sent from the PC 14, based on the capability information sent from the other devices connected to the network in response to the image processing execution environment related capability information inquiry. Let us say that the server device is the server 20a. Then, it discloses the virtual printer information 134 to the PC 14, stating that image processing suitable to the printer to which its own device is provided can be performed.

Upon receiving the virtual printer information 134, once the PC 14 judges that image processing can be performed at the network interface card 40a side, it transmits printing data 104 containing image data before image processing to the network interface card 40a, as shown in FIG. 16.

The network interface card 40a, upon receiving this printing data 104, transfers the received printing data and image processing program 106 to the server 20a, and commissions image processing.

Upon receiving the printing data and image processing program 106, the server 20b performs image processing of the printing data using the image processing program, and transmits the post-processing printing data 108 to the network interface card 40a. The network interface card 40a performs printing output based on the received printing data 108.

Figure 17:
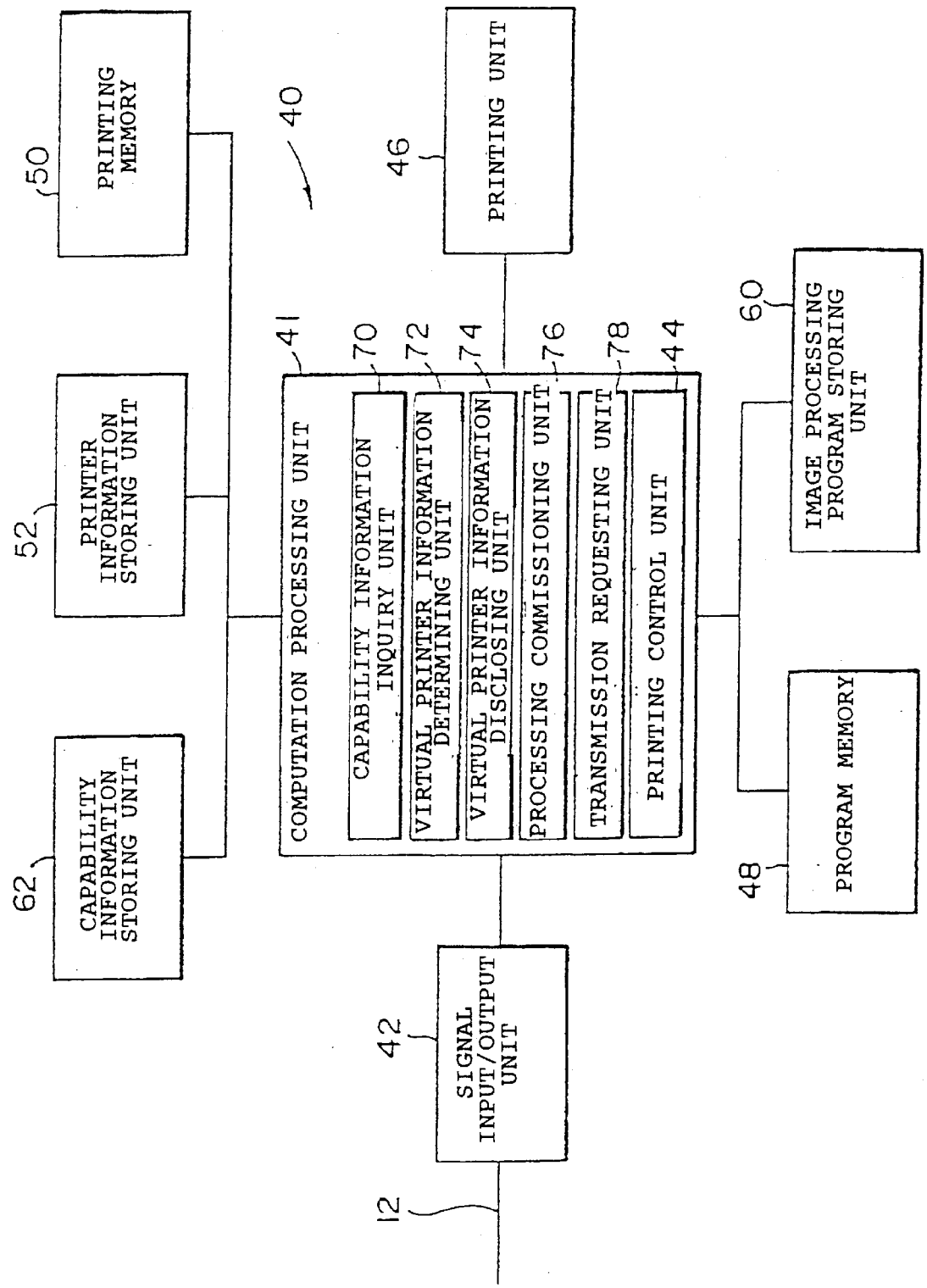
FIG. 17 is a function block diagram of a client network interface card of the third embodiment.

FIG. 17 shows a function block diagram of a device functioning as a client network interface card, as with the network interface card 20a. In FIG. 17, parts which have the same types of functions as the functions of the client network interface card in the function block diagram shown in FIG. 3 or FIG. 12 are denoted with the same reference numerals.

The client network interface card according to the present embodiment is comprised of a signal input/output unit 42 connected to the communication line 12, a computation processing unit 41 configured of a CPU or the like, program memory 48, printing memory 50, a printer information storing unit 52, a capability information storing unit 62, and an image processing program storing unit 60.

Here, the image processing program storing unit 60 stores image processing programs performing image processing suitable to the device of its own device.

The computation processing unit 41 operates based on the programs stored in the program memory 48, and functions as a capability information inquiry unit 70, a virtual printer information determining unit 72, a virtual printer information disclosing unit 74, a processing commissioning unit 76, a transmission requesting unit 78, and a printing control unit 44.

With the present embodiment, the capability information inquiry unit 70 inquires of other devices connected to the network regarding capability information relating to image processing execution environments, and the capability information storing unit 62 stores the capability information relating to the image processing execution environments.

With the present embodiment, the given processing which the processing commissioning unit 76 commissions is image processing of the printing data received from the PC 14. Accordingly, the processing commissioning unit 76 determines a server device having a sufficient image processing execution environment for performing the image processing, based on the image processing execution environment related capability information. Then, the image processing programs stored in the image processing program storing unit 60 of its own device and the printing data received from the PC 14 are transmitted to the server device in real-time, thus commissioning image processing.

Also, an arrangement may be made wherein, in the event that the server device has an image processing program of the same type of the image processing program which the network interface card is attempting to transmit, the version information is checked, and transmitted only in the event that the version information of the image processing program which the network interface card has indicates that this is newer, for example.

Figure 18:
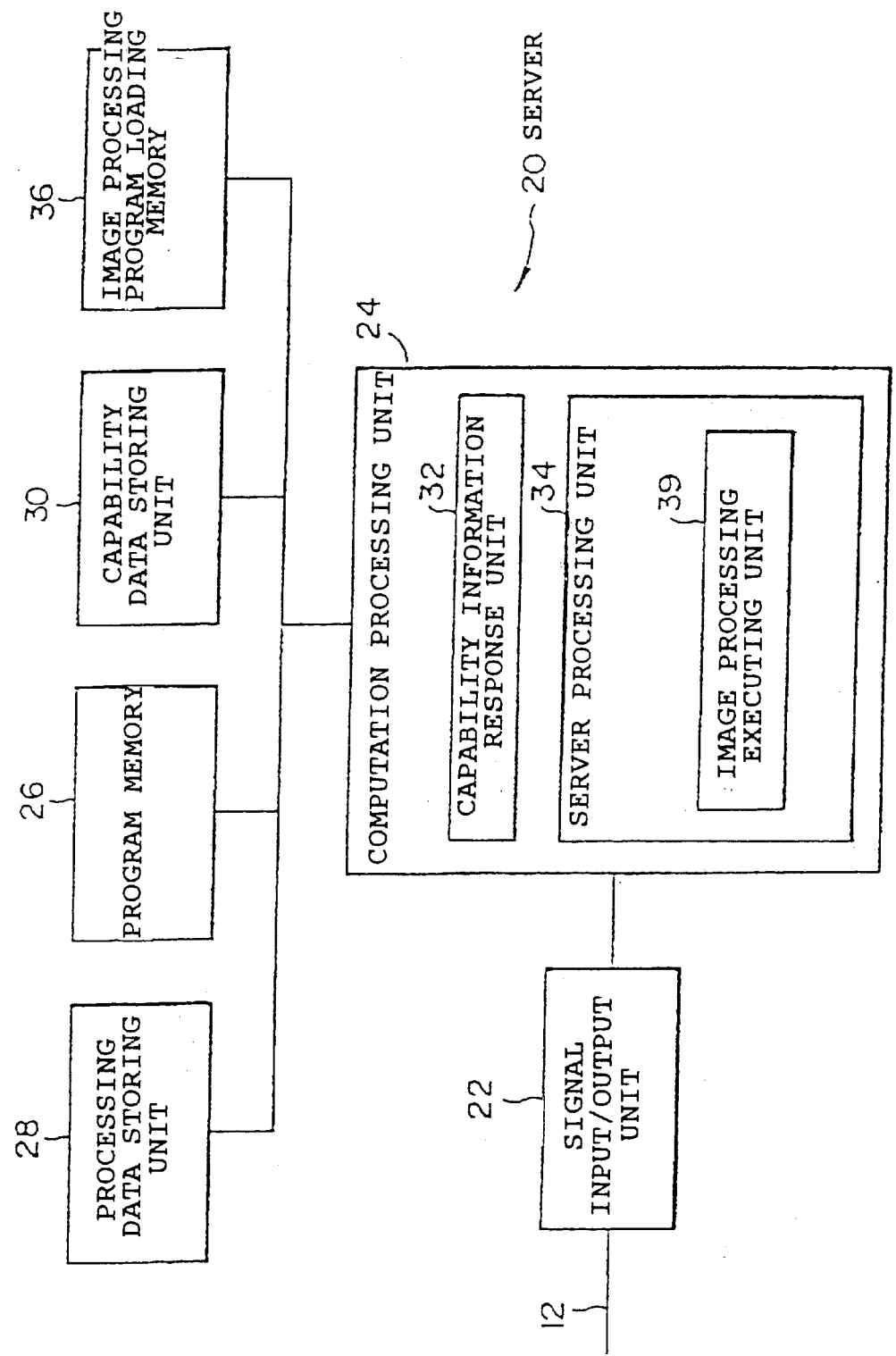
FIG. 18 is a function block diagram of a server device of the third embodiment.

FIG. 18 shows a function block diagram of a device functioning as a server device for image processing, as with the server 20b. In FIG. 18, parts which have the same types of functions as the functions of the server device in the function block diagram shown in FIG. 4 or FIG. 13 are denoted with the same reference numerals.

The server device according to the present embodiment is comprised of a signal input/output unit 22 which performs input and output of data via the communication line 12, a computation processing unit 24 configured of a CPU or the like, program memory 26, a processing data storing unit 28, image processing program loading memory 36, and a capability data storing unit 30. The processing data storing unit 28 stores the printing data regarding which the image processing commission has been received, and the printing data following image processing.

The image processing program loading memory 36 stores image processing programs transmitted from the client network interface card.

The capability data storing unit 30 stores capability information relating to the image processing execution environment of its own device.

The computation processing unit 24 contains a capability information response unit 32 and server processing unit 34.

The capability information response unit 32, in response to the capability information inquiry relating to image processing execution environment from the client network interface card, responds with capability information of the image processing execution environment of its own device stored in the capability data storing unit 30, to the client network interface card.

The server processing unit 34 contains an image processing execution unit 39, performs image processing of the printing data using the image processing program received from the client network interface card, and transmits the post-image-processing printing data to the client network interface card, in response to transmission requests from the client network interface card.

According to the present embodiment, the PC 14 can commission printing processing to the network interface card with increased image processing execution environment capabilities. Thus, the PC side does not need to execute image processing programs which have a great processing load. Accordingly, printing can be started at an early time without having time taken up by image processing, even with a network interface card with low processing capabilities.

Also, the client network interface card transmits image processing programs suitable to the device of its own device, to other server devices connected to the network, and commission execution of image processing thereto, so memory efficiency is better than cases wherein server devices are made to carry image processing programs corresponding to all devices.

Incidentally, it is needless to say that the above embodiments may be carried out independently, or may be carried out in a combined manner. In the event of carrying out the embodiments in a combined manner, the client network interface card discloses all capabilities relating to printer related functions, memory capacity related functions, and image processing execution environment related functions, as virtual printer information to the PC, and makes as necessary conversion processing commissions, storage processing commissions, and image processing execution commissions, to the server devices on the network.

Also, the above embodiments have been described with an example of providing client network interface cards and server devices within a network system 10, but in the event that there is a network interface card with sufficiently high capabilities, the system 10 may be configured so as to provide this network interface card with functions of a server device.

Thus providing the network interface card with not only the functions of a client network interface card but also as a server device allows the network interface card to behave as a client network interface card or behave as a server device, as necessary. Note that the flowcharts of the operation of the network interface card shown in FIG. 7, FIG. 8, and FIG. 9 are flowcharts representing the operation in the case of having both the functions of a client device and the functions of a server device.

The network system according to the present invention is not restricted to the above embodiments, rather, various variations may be carried out within the scope of the present invention.

What is claimed is:

1. A network system containing a network interface card that receives printing commands from a computer, and at least one other device, said network interface card comprising:

a capability information inquiry unit that inquires said other device connected to said network regarding capability information of capabilities including at least one of memory capacity of network interface card, processing relating to printer language, image processing, and image processing execution environment;

a virtual printer information determining unit that judges whether or not there are other devices which will support capability improvements of its own device, based on said capability information sent from said other device connected to said network in response to said capability information inquiry, and that determines virtual printer information of its own device; and a virtual printer information disclosing unit that discloses said virtual printer information to the computer, and said other device comprising capability information response unit that responses to said network interface card regarding capability information of capabilities including at least one of memory capacity of network interface card, processing relating to printer language, image processing, and image processing execution environment, in response to said capability information inquiry.

2. The network system according to claim 1,
said virtual printer information determining unit determining virtual printer information to the effect that at least one of given printer commands and printer languages can be processed, in the event that said other device connected to said network has conversion capabilities for converting at least one of said given printer commands and printer languages into at least one of printer commands and printer languages which a printer can process, and
said virtual printer information disclosing unit disclosing said determined virtual printer information to the computer.

3. The network system according to claim 1, said network interface card further comprising:
a processing commissioning unit, in the event a printing commission for printing data received from said computer exceeds the original processing capabilities of its own device, a server device to send the received printing data to being determined based on said capability information sent from said other device, said printing data being transmitted to said server device in real-time, and the given processing being commissioned;
a transmission requesting unit that requests transmission of printing data to said server device following given processing; and
a printing control that performs control so as to print based on printing data following said given processing, received in response to said transmission request, said server device comprising:
a server processing unit, said given processing being performed to said printing data received from said network interface card, and printing data following said given processing being transmitted to said network interface card in response to transmission request from said network interface card.

4. The network system according to claim 3,
said given processing comprising conversion processing for converting said printing data received from the computer into printing data suitable for the printer to which said network interface is provided,
said processing commissioning unit determining the server device to perform the conversion processing, based on said capability information relating to printer-related functions including at least one of printer language-related processing and image processing, and printing data received from the computer, and
said server processing unit comprising a conversion processing unit that converts said printing data received from said network interface card into printing data suitable for the printer to which said network interface card is provided.

5. The network system according to claim 4,
said processing commissioning unit transmitting device information of its own device to said server device at the time of commissioning said given processing, and
said conversion processing unit converting said printing data into printing data suitable for the printer to which said network interface is provided, based on said device information.

6. The network system according to claim 5,
said given processing including storing processing for storing said printing data received from the computer,
said processing commissioning unit determining the server device for performing said storing processing, based on capability information relating to said memory capacity, and
said server processing unit comprising a storage processing unit that receives printing data sent from said network interface card and storing this in the memory of its own device.

7. The network system according to claim 6,
said processing commissioning unit storing printing data sent from said computer in the printing memory of its own device until there is no more empty memory, and after there is no more empty printing memory, transferring received printing data to said server device in real-time,
said transmission requesting unit requesting transmission of printing data which its own device has transmitted to said server device, according to a state of empty printing memory due to printing,
said printing control unit performing control so as to sequentially receive printing data transferred before, and storing this in the printing memory of its own device, and
printing and transfer of printing data of said server device being executed in parallel.

8. The network system according to claim 7,
said given processing including image processing of said printing data received from the computer,
said network interface card further comprising a program memory that stores image processing programs which perform image process suitable to the device to which its own device has been mounted, with regard to said printing data,
said processing commissioning unit determining a server device having an execution environment for said image processing, based on capability information relating to said image processing execution environment, and transmitting said printing data and said image processing programs for performing image processing for said printing data to said server device, and
said server processing unit further comprising an image processing execution unit that receives said printing data and said image processing programs for performing image processing of said printing data sent from said network interface card, and that performs image processing of said printing data using said image processing programs.

9. The network system according to claim 8, said network interface card performing inquiry of said capability information to another device connected to said network, in the event of at least one of the following cases:
a case wherein its own device is connected to the network,
a case wherein a new device has been connected to said network, and
a case wherein there has been a capability information inquiry from said computer.

10. The network system according to claim 9,
said network interface card comprising a capability information storing unit that correlates said capability information to devices on the network, and that stores said information.

11. The network system according to claim 10,
said printing data comprising image data or image data and printer commands.

12. A network interface card capable of receiving printing commands from a computer, connected to a network system containing at least one device, said network interface card comprising:

a capability information inquiry unit that inquires said other device connected to said network regarding capability information of capabilities including at least one of memory capacity of its own device, processing relating to printer language, image processing, and image processing execution environment;

a virtual printer information determining unit that judges whether or not there are other devices which will support capability improvements of its own device, based on said capability information sent from said other device connected to said network in response to said capability information inquiry, and that determines virtual printer information of its own device; and a virtual printer information disclosing unit that discloses said virtual printer information to the computer.

13. The network interface card according to claim 12, said virtual printer information determining unit determining virtual printer information to the effect that at least one of given printer commands and printer languages can be processed, in the event that said other device connected to said network has conversion capabilities for converting at least one of said given printer commands and printer languages into at least one of printer commands and printer languages which a printer can process, and said virtual printer information disclosing unit disclosing said determined virtual printer information to the computer.

14. The network interface card according to claim 13, further comprising:

a processing commissioning unit, in the event a printing commission for printing data received from said computer exceeds the original processing capabilities of own device, a server device to send the received printing data to being determined based on said capability information sent from said other device, said printing data being transmitted to said server device in real-time, and the given processing being commissioned;

a transmission requesting unit that requests transmission of printing data to said server device following given processing; and a printing control unit that performs control so as to print based on printing data following said given processing, received in response to said transmission request.

15. The network interface card according to claim 14, said given processing comprising conversion processing for converting said printing data received from the computer into printing data suitable for its own device, and said processing commissioning unit determining the server device to perform the conversion processing, based on said capability information relating to printer-related functions including at least one of printer language-related processing and image processing, and printing data received from the computer.

16. The network interface card according to claim 15, said processing commissioning unit transmitting device information of own device to said server device at the time of commissioning said given processing.

17. The network interface card according to claim 16, said given processing including storing processing for storing said printing data received from the computer, and said processing commissioning unit determining the server device for performing said storing processing, based on capability information relating to said memory capacity.

18. The network interface card according to claim 17, said processing commissioning unit storing printing data sent from said computer in a printing memory of its own device until there is no more empty memory, and after there is no more empty printing memory, transferring received printing data to said server device in real-time, said transmission requesting unit requesting transmission of printing data which its own device has transmitted to said server device, according to a state of empty printing memory due to printing, said printing control unit performing control so as to sequentially receive printing data transferred before, and storing this in said printing memory, and printing and transfer of printing data of said server device being executed in parallel.

19. The network interface card according to claim 17, said given processing including image processing of said printing data received from the computer, said network interface card further comprising a program memory that stores image processing programs which perform image process suitable to a device to which its own device has been mounted, with regard to said printing data, and said processing commissioning unit determining a server device having an execution environment for said image processing, based on capability information relating to said image processing execution environment, and transmitting said printing data and said image processing programs for performing image processing for said printing data to said server device.

20. The network interface card according to claim 19, which performs inquiry of said capability information to another device connected to said network, in the event of at least one of the following cases:

a case wherein its own device is connected to the network, a case wherein a new device has been connected to said network, and a case wherein there has been a capability information inquiry from said computer.

21. The network interface card according to claim 20, further comprising a capability information storing unit that correlates said capability information to devices on the network, and that stores said information.

22. The network interface card according to claim 21, further comprising:

a capability information response unit that responds to said other device connected to network regarding capability information of capabilities including at least one of memory capacity of its own device, processing relating to printer language, image processing, and image processing execution environment, in response to a capability information inquiry from said other device regarding capabilities containing at least one of memory capacity, processing relating to printer language, image processing, and image processing execution environment; and a server processing unit, given processing being performed to printing data received from another network interface card connected to the network, and printing data following said given processing being transmitted to said other network interface card in response to transmission request from said other network interface card.

23. The network interface card according to claim 22, said server processing unit comprising a conversion processing unit that converts said printing data received from said other network interface card into printing data suitable for a printer to which said other network interface card is provided.

24. The network interface card according to the claim 23, said conversion processing unit converting into printing data suitable for the printer to which said other network interface card is provided, based on said device information received from said other network interface card.

25. The network interface card according to claim 24, said server processing unit comprising a storage processing unit that receives printing data sent from said network interface card and that stores this in said memory.

26. The network interface card according to claim 25, said server processing unit comprising an image processing execution unit that receives said printing data and said image processing programs for performing image processing of said printing data sent from said other device, and that performs image processing of said printing data using said image processing programs.

27. The network interface card according to claim 26, said printing data comprising image data or image data and printer commands.

* * * * *